US012753022B2

(12) United States Patent
Nitzberg et al.

(10) Patent No.: US 12,753,022 B2
(45) Date of Patent: Oct. 6, 2026

(54) HIGH-RATE AT HIGH-DENSITY TUNABLE ACCUMULATION CONVEYOR

(71) Applicant: Intelligrated Headquarters, LLC, Mason, OH (US)

(72) Inventors: Jason-David Nitzberg, Batavia, OH (US); Jason A. Johnson, Hamilton, OH (US); Raymond Neiser, Batavia, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 154 days.

(21) Appl. No.: 18/826,803

(22) Filed: Sep. 6, 2024

(65) Prior Publication Data

US 2024/0425298 A1 Dec. 26, 2024

Related U.S. Application Data

(63) Continuation of application No. 18/470,949, filed on Sep. 20, 2023, now Pat. No. 12,134,526, which is a (Continued)

(51) Int. Cl.
*B65G 47/26* (2006.01)

(52) U.S. Cl.
CPC ...... *B65G 47/261* (2013.01); *B65G 2203/042* (2013.01); *B65G 2203/044* (2013.01)

(58) Field of Classification Search
CPC ............ B65G 47/261; B65G 2203/042; B65G 2203/044

(Continued)

(56) References Cited

U.S. PATENT DOCUMENTS 5,060,785 A 10/1991 Garrity
5,070,995 A 12/1991 Schaffer et al.

(Continued)

FOREIGN PATENT DOCUMENTS

CN 102357057 A 2/2012
EP 2457550 A1 5/2012

(Continued)

OTHER PUBLICATIONS

EP Office Action Mailed on Dec. 11, 2024 for EP Application No. 20154434, 4 page(s).

(Continued)

*Primary Examiner* — Gene O Crawford
*Assistant Examiner* — Lester Rushin, III
(74) *Attorney, Agent, or Firm* — ALSTON & BIRD LLP

(57) ABSTRACT

Various embodiments disclosed herein provide for an improved accumulation conveyor and systems and methods for controlling a high rate, high density tunable accumulation conveyor. In one embodiment, an accumulation conveyor system determines whether an item detection variable associated with a second zone of a plurality of zones is satisfied, wherein the second zone is downstream of a first zone. The accumulation conveyor system determines whether at least one of two operational characteristic variables is satisfied. In an instance where both the item detection variable and at least one operational characteristic variable are satisfied, the accumulation conveyor system is configured to set a zone operating state associated with the first zone to inactive and send a command signal comprising the zone operating state associated with the first zone to a control module associated with the first zone. In another embodiment, an improved method for adjusting aggressiveness is disclosed. In another embodiment, a tunable release rate accumulation conveyor is disclosed. In still another (Continued)

embodiment, a tunable crowding accumulation conveyor is disclosed.

20 Claims, 6 Drawing Sheets

Related U.S. Application Data continuation of application No. 18/066,402, filed on Dec. 15, 2022, now Pat. No. 11,807,469, which is a continuation of application No. 17/326,462, filed on May 21, 2021, now Pat. No. 11,560,275, which is a continuation of application No. 16/750,311, filed on Jan. 23, 2020, now Pat. No. 11,059,676.

(60) Provisional application No. 62/799,489, filed on Jan. 31, 2019.

(58) Field of Classification Search
USPC ........................................................ 198/460.1
See application file for complete search history.

(56) References Cited

U.S. PATENT DOCUMENTS

| | | | |
|---|---|---|---|
| 5,341,916 | A | 8/1994 | Doane et al. |
| 5,823,319 | A | 10/1998 | Resnick et al. |
| 5,862,907 | A | 1/1999 | Taylor |
| 6,315,104 | B1 | 11/2001 | Ebert |
| 6,889,822 | B1 | 5/2005 | Wagner et al. |
| 7,756,603 | B1 | 7/2010 | Delaney et al. |
| 8,763,788 | B2 | 7/2014 | Neiser |
| 9,199,802 | B2 | 12/2015 | Neiser et al. |
| 10,233,028 | B2 | 3/2019 | Combs et al. |
| 11,059,676 | B2 | 7/2021 | Nitzberg et al. |
| 11,560,275 | B2 | 1/2023 | Nitzberg et al. |
| 11,807,469 | B2 | 11/2023 | Nitzberg et al. |
| 2003/0116408 | A1 | 6/2003 | Topmiller et al. |
| 2006/0272929 | A1 | 12/2006 | Taylor |
| 2011/0067977 | A1 | 3/2011 | Neiser |
| 2014/0277698 | A1 | 9/2014 | Combs et al. |

FOREIGN PATENT DOCUMENTS

| | | | | |
|---|---|---|---|---|
| EP | 3428089 | A1 | | 1/2019 |
| GB | 2582122 | | * | 9/2020 |
| JP | 4013465 | B2 | | 11/2007 |
| JP | 2018-135182 | A | | 8/2018 |
| KR | 10-2011-0139295 | A | | 12/2011 |
| WO | WO2004026737 | | * | 4/2004 |

OTHER PUBLICATIONS

U.S. Appl. No. 18/470,949, filed Sep. 20, 2023, 2024-0017937, Issue Fee Payment Verified.
U.S. Appl. No. 18/066,402, filed Dec. 15, 2022, U.S. Pat. No. 11,807,469, Patented.
U.S. Appl. No. 17/326,462, filed May 21, 2021, U.S. Pat. No. 11,560,275, Patented.
U.S. Appl. No. 16/750,311, filed Jan. 23, 2020, U.S. Pat. No. 11,059,676, Patented.
CN Notice of Allowance, including Search Report Mailed on Jun. 26, 2023 for CN Application No. 202010079311, 5 page(s).
CN Office Action, including Search Report Mailed on Feb. 3, 2023 for CN Application No. 202010079311, 12 page(s).
English translation of CN Notice of Allowance dated Jun. 26, 2023 for CN Application No. 202010079311, 2 page(s).
English Translation of CN Office Action, including Search Report, dated Feb. 3, 2023 for CN Application No. 202010079311, 14 page(s).
EP Office Action Mailed on May 31, 2022 for EP Application No. 20154434, 6 pages.
European Partial search report Mailed on Jun. 9, 2020 for EP Application No. 20154434.
European search opinion Mailed on Oct. 1, 2020 for EP Application No. 20154434.
European search report Mailed on Oct. 1, 2020 for EP Application No. 20154434.
Honeywell Intelligrated, ZoneFlex(R) Advanced| Honeywell Intelligrated Video, Nov. 12, 2018, YouTube, 2 pages, https://www.intelligrated.com/en/resources/videos/zoneflexr-advanced, Apr. 9, 2020.
Invata Intralogistics, Invata Intralogistics Accumulation Conveyor, Mar. 5, 2015 to Sep. 23, 2019, 5 pages, https://web.archive.org/web/20150305024536/https://www.invata.com/conveyor-systems/accumulation-conveyor/, Apr. 9, 2020.
Non-Final Rejection Mailed on Dec. 22, 2020 for U.S. Appl. No. 16/750,311.
Non-Final Rejection Mailed on Mar. 30, 2023 for U.S. Appl. No. 18/066,402, 9 page(s).
Notice of Allowance and Fees Due (PTOL-85) Mailed on Jun. 20, 2024 for U.S. Appl. No. 18/470,949, 7 page(s).
Notice of Allowance and Fees Due (PTOL-85) Mailed on Jun. 22, 2023 for U.S. Appl. No. 18/066,402, 8 page(s).
Notice of Allowance and Fees Due (PTOL-85) Mailed on Mar. 17, 2021 for U.S. Appl. No. 16/750,311.
Notice of Allowance and Fees Due (PTOL-85) Mailed on Sep. 18, 2023 for U.S. Appl. No. 18/066,402, 3 page(s).
Notice of Allowance and Fees Due (PTOL-85) Mailed on Sep. 20, 2022 for U.S. Appl. No. 17/326,462, 8 page(s).

* cited by examiner

HIGH-RATE AT HIGH-DENSITY TUNABLE ACCUMULATION CONVEYOR

CROSS-REFERENCE TO RELATED APPLICATIONS

The present application is a continuation of U.S. patent application Ser. No. 18/470,949, filed Sep. 20, 2023, which is a continuation of U.S. patent application Ser. No. 18/066,402 (now U.S. Pat. No. 11,807,469), filed Dec. 15, 2022, which is a continuation of U.S. patent application Ser. No. 17/326,462 (now U.S. Pat. No. 11,560,275), filed May 21, 2021, which is a continuation of U.S. patent application Ser. No. 16/750,311 (now U.S. Pat. No. 11,059,676), filed Jan. 23, 2020, which claims priority to U.S. Provisional Patent Application No. 62/799,489, filed Jan. 31, 2019, the entire contents of each of the foregoing applications is incorporated by reference herein in its entirety.

TECHNICAL FIELD

The present application relates generally to the field of accumulating conveyors and, more specifically, to enhanced control systems for increasing density and throughput and tuning of accumulation conveyors.

BACKGROUND

Various accumulation conveyors are available that convey, transport, organize and accumulate products, articles, and/or the like in material or product handling environments. Accumulation conveyors are broken into many separately controlled zones and as product is detected in each zone with sensors (such as photoeyes), the zones fill up, and these zones are shut off or disabled, stopping and accumulating the product into groups. As zones empty out, the accumulation conveyor enables (e.g., energizes) other zones in order to cause the product to go. The way an accumulation conveyor (or accumulating conveyor) handles both the going and the stopping is referred to as the "accumulation logic". Applicant has identified a number of deficiencies and problems associated with conventional accumulation conveyors and existing accumulation logic, methods, and systems for controlling the operation of such accumulation conveyors. Through applied effort, ingenuity, and innovation, many of these identified problems have been solved by developing solutions that are included in embodiments of the present disclosure, many examples of which are described in detail herein.

BRIEF SUMMARY

Various embodiments provided herein disclose improved systems, accumulation conveyors, and methods for controlling and tuning an accumulation conveyor to increase the density and throughput of such accumulation conveyor.

One embodiment is directed to an accumulation conveyor system comprising a conveyor having a plurality of zones; one or more sensors associated with each zone of the plurality of zones; one or more control modules associated with the plurality of zones; a controller in communication with the one or more control modules, the controller comprising at least one processor and at least one memory, the at least one memory storing executable instructions therein, wherein the executable instructions are configured to, in execution with the at least one processor, cause the controller to: determine whether an item detection variable associated with a second zone of the plurality of zones is satisfied, wherein the second zone is downstream of a first zone; determine whether at least one of two operational characteristic variables is satisfied, the two operational characteristic variables comprising a first operational characteristic variable and a second operational characteristic variable; in an instance where both the item detection variable and at least one operational characteristic variable are satisfied, set a zone operating state associated with the first zone to inactive; and send a command signal comprising the zone operating state associated with the first zone to the control module associated with the first zone.

In one embodiment, in an instance where the item detection variable is not satisfied, the executable instructions are further configured to cause the controller to set the zone operating state associated with the first zone to active.

In some embodiments, the item detection variable associated with the second zone is satisfied when a presence of an object on the conveyor is detected via the one or more sensors associated with the second zone. In certain embodiments, at least one of the one or more sensors associated with the second zone is a photo eye. In still further embodiments, the item detection variable associated with the second zone is satisfied when the controller receives a blocked signal from the photo eye.

In some embodiments, in an instance where the first operational characteristic variable and the second operational characteristic variable are not satisfied, the executable instructions are further configured to cause the controller to set the zone operating state associated with the first zone to active.

In some embodiments, the first operational characteristic variable is satisfied when a zone operating state associated with the second zone is inactive.

In some embodiments, the first zone is associated with a roller countdown timer and the second operational characteristic variable is satisfied when the roller countdown timer is expired. In certain embodiments, the roller countdown timer is configured to activate each instance the zone operating state associated with the first zone is inactive. In still further embodiments, the roller countdown timer is configured to reset each instance the zone operating state associated with the first zone is active.

In some embodiments, the first zone is assigned a local zone number and the second operational characteristic variable is satisfied when the local zone number is less than a threshold associated with assignment of local zone numbers.

Still other embodiments are directed to a method of controlling a release rate of one or more zones of an accumulation conveyor, the method comprising detecting an indication to adjust a first release rate associated with a first zone, wherein the first release rate is separately configurable from a level of accumulation aggressiveness of the accumulation conveyor; determining a second release rate associated with the first zone based upon at least a configured speed of the first zone and generating a release rate timer corresponding to the second release rate; activating the release rate timer associated with the first zone; and upon expiration of the release rate timer associated with the first zone, activating a second zone, wherein the second zone is upstream of the first zone.

In one embodiment, detecting an indication to adjust the first release rate associated with the first zone is based upon user input received via a controller user interface. In some embodiments, the configured speed of the first zone is determined based upon a percentage of a maximum speed associated with the first zone and the detected indication to adjust the first release rate.

In still further embodiments, the method further comprises detecting an indication to adjust a third release rate associated with a third zone; determining a fourth release rate associated with the third zone based upon at least a configured speed of the third zone and generating a release rate timer corresponding to the fourth release rate, wherein the fourth release rate associated with the third zone is different than the second release rate associated with the first zone; activating the release rate timer associated with the third zone; and upon expiration of the release rate timer associated with the third zone, activating a fourth zone, wherein the fourth zone is upstream of the third zone.

Still other embodiments are directed to a method of adjusting a level of accumulation aggressiveness associated with an accumulation conveyor comprising receiving conveyor data input, the conveyor data input comprising configuration variables associated with the accumulation conveyor; querying an accumulation settings repository for accumulation settings based upon at least the conveyor data input; determining an initial accumulation mode based upon at least the conveyor data input and the accumulation settings returned by the query, the initial accumulation mode associated with one or more aggressiveness parameters; programmatically generating an aggressiveness linear equation based upon at least the accumulation settings returned by the query; assigning an aggressiveness value associated with the initial accumulation mode as a default value of the aggressiveness linear equation; and in response to detecting a change in the aggressiveness value, adjusting at least one of the one or more aggressiveness parameters associated with the initial accumulation mode in accordance with the aggressiveness linear equation.

In some embodiments, adjusting at least one of the one or more aggressiveness parameters associated with the initial accumulation mode in accordance with the aggressiveness linear equation adjusts the level of accumulation aggressiveness associated with the accumulation conveyor in comparison to the default value.

In certain embodiments, detecting a change in the aggressiveness value corresponds to an indication of increasing the aggressiveness value. In some embodiments, detecting a change in the aggressiveness value corresponds to an indication of decreasing the aggressiveness value.

In some embodiments, the method further comprises rendering an aggressiveness configuration interface to a controller user interface, wherein the conveyor data input is associated with user engagement of the aggressiveness configuration interface; and configuring an aggressiveness interface object based upon at least the aggressiveness linear equation and the default value and outputting the aggressiveness interface object to the controller user interface, wherein detecting a change in the aggressiveness value comprises receiving user input associated with user engagement of the aggressiveness interface object.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Overview

Figure 1:
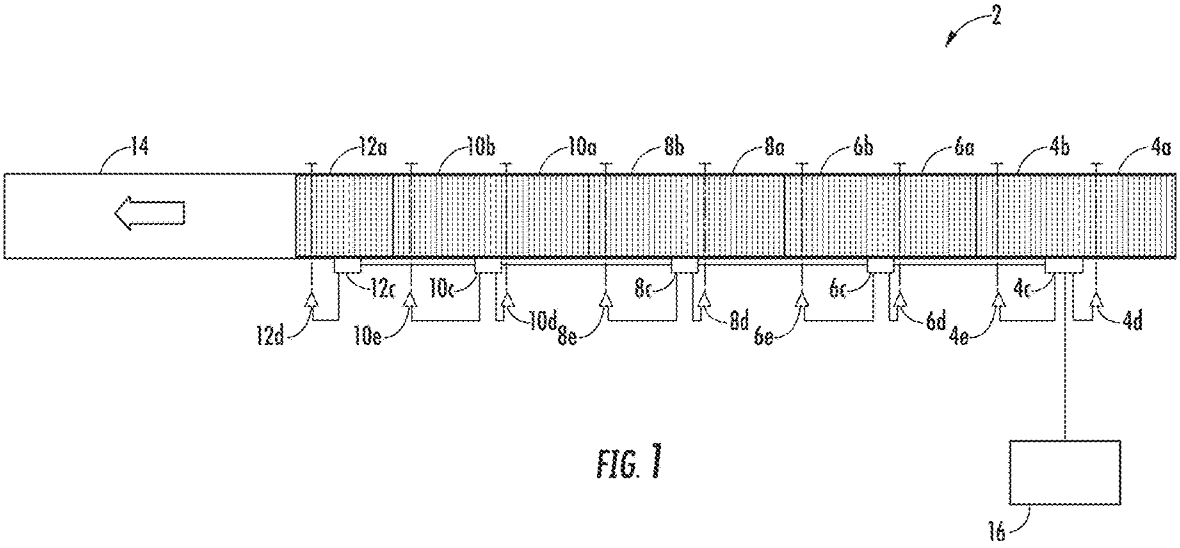
FIG. 1 illustrates an example zone-based accumulation conveyor in accordance with various aspects and embodiments of the subject disclosure.

Accumulation conveyors (or accumulating conveyors) are commonly used in product handling environments for the transport, grouping, accumulation, and collecting together of materials, products, or articles. Accumulation of articles into groups, often called slugs, reduces delays in material handling by temporarily stopping or holding, articles and then releasing such articles in coordination with other downstream operations. As the product density increases on the conveyor, however, the rate of flow of said product diminishes significantly thereby causing the whole conveyor system to slow down, backing up and shutting down upstream feeding conveyors, even in situations where everything is moving. Existing accumulation modes (logic and/or circuit) are built on a traditional model based on historic mechanical conveyor controls where spring-powered pop-up rollers would mechanically turn on and off other rollers. These modes do not differentiate from when product is accumulating vs. flowing, causing the rate of flow to diminish at higher densities. For example, in the simplest case, even when product is flowing through a zone, because it is blocking the sensor, the upstream zone is slowing down because it thinks it should be accumulating.

Typically, in an effort to increase the rate of flow, there are control strategies used today such as 'slugging' (e.g., turning on all zones) that would make all product move at its highest rate if the whole conveyor is flowing. However, because of the purpose and usual length of the conveyors in the hundreds of feet, usually there are multiple things or processes occurring at multiple areas of the same conveyor. For example, various parts of the conveyor may be releasing, accumulating, staying still, or re-indexing forward, while others may be flowing. As such, slugging all of these conveyor areas essentially defeats the purpose of an accumulating conveyor. Thus, it is desirable for an accumulation conveyor to support both a high product density and high rate of flow while maintaining its ability to provide accumulation of product.

Other efforts to increase the rate of flow and/or adjust the aggressiveness of accumulation by adjusting or stacking operational modes in existing accumulation control systems has proven to be complicated and non-intuitive. That is, an existing control system can allow many different accumulation configurations and operational modes to be applied, but the downside of having a variety of accumulation configuration parameters is the plethora of additional operational modes which can be stacked together, sometimes helping but usually hurting product handling and rate depending on their combination. Tuning these settings on an accumulating conveyor have proven challenging and requiring a very specific expertise that most field engineers lack due to the infrequency of contact and them being stretched across so many different products in a conveyor system. As such, setting up and adjusting current accumulation conveyor systems by stacking operational modes without guidance is prone to error, resulting in missed deadlines and product damage. Thus, it is also desirable to provide an accumulation conveyor system that is more intuitive and allows for easy set-up and adjustments with little downtime.

Various embodiments disclosed herein provide for an accumulation conveyor that enables high rate, high density accumulation. That is, various embodiments of the present invention are directed to improved systems, accumulation conveyors, and methods for controlling an accumulation conveyor to increase the density and throughput of such accumulation conveyor. In one example, one or more sensors are associated with each zone of an accumulation conveyor, the accumulation conveyor comprising a plurality of zones. Such sensors are configured to monitor the occupancy of a zone by a product or item transporting on the conveyor. In combination with one or more other data items, such as the operating state of a downstream zone, the status of local zone roller timer, the status of a prejam timer, the status of a release rate time, such sensor data and status data may then be utilized to configure the operating state of a local zone to improve accumulation. In some embodiments, the accumulation aggressiveness and/or release rate are each configured to be adjustable via sliding linear scales, affording cost and time savings as well as simplifying the setup and fine-tuning of accumulation conveyor systems. Accordingly, the present disclosure provides example technological improvement that result in improved systems, accumulation conveyors, and methods for controlling an accumulation conveyor to increase, in some examples, the density and throughput of such accumulation conveyor.

Definitions

One or more embodiments are now more fully described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

The terms "accumulation conveyor" and "accumulating conveyor" refer to any conveyor, carousel, assembly line, production line, conveyor belt, and/or any other form of object utilized for moving, transporting, and accumulating product, components, materials, articles, or items and is suitable for use or operation in a product handling environment.

As used herein, an individual zone being examined at a given time may be referred to when being examined as the "local zone." The "downstream direction" or "downstream" is the direction articles travel on an accumulation conveyor, and "upstream direction" or "upstream" is the direction opposite of the direction articles travel on an accumulation conveyor. A "downstream zone" is a zone which is disposed in the downstream direction from another zone. An "upstream zone" is a zone which is disposed in the upstream direction from another zone. By way of illustration and not limitation, referring to FIG. 1, in an instance wherein zone 4*b* is the local zone, zone 4*a* is an upstream zone and zone 6*a* is a downstream zone. Herein for convenience, these upstream and downstream zones are referred to as a "neighborhood." An upstream neighborhood and a downstream neighborhood may extend one or more zones in the particular direction. The operational mode effected by a control scheme that considers the conditions of one or more neighboring zones s referred to as a "neighborhood mode." Neighborhood is used herein only as a label referring to this type of control scheme, and does not represent a limitation on the scope of the claims.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including" and variants thereof are used in either the detailed description or the claims, these terms are intended to be inclusive in a manner similar to the term "comprising."

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

Moreover, the word "exemplary" is used herein to mean "serving as an example, instance, or illustration." Any implementation, aspect, or design described herein as "exemplary" is not necessarily to be construed as preferred or advantageous over other implementations, aspects, or designs. Rather, use of the word exemplary is intended to present concepts in a concrete fashion.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, articles "a" and "an" as used in this application and the appended claims should generally be construed to mean "one or more" unless specified otherwise or clear from context to be directed to a singular form.

The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "aggressiveness of accumulation" is used herein to refer to an amount of intensity of impact as product accumulates or how hard or soft product hits other product as such product slows down on the conveyor.

The term "item detection variable" should be understood to refer to one or more variables, parameters, criteria, or conditions associated with the detection of an item which is used to determine the zone operating state for one or more zones. In some embodiments, the item detection variable defines the variables, parameters, criteria, or conditions to determine whether an item is detected in a particular zone. Zone sensor data is utilized to determine whether a sensor associated with a selected zone indicates an item is detected such that the selected zone may be occupied. In some embodiments, if a sensor associated with a selected zone transmits a signal indicating detection of an item (e.g., a blocked signal from a photo eye) for a period of time equal to or greater than a pre-determined time period, such as e.g., zero, 0.75 seconds, 1.0 seconds or 1.5 seconds, such zone is considered occupied. In some embodiments, an item detection variable is satisfied with a selected zone when the zone sensor data associated with the selected zone indicates such zone is occupied. For example, an item detection variable associated with a downstream zone is satisfied when a presence of an item on the conveyor is detected via the one or more sensors associated with the downstream zone. An item detection variable associated with a downstream zone is not satisfied when a presence of an item on the conveyor is not detected via the one or more sensors associated with the downstream zone. Such item detection variable may be used to determine the zone operating state for a different selected zone.

The term "operational characteristic variable" should be understood to refer to one or more variables, parameters, criteria, or conditions associated with operational characteristics of one or more zones which is used to determine the zone operating state for one or more zones. In some embodiments, the operational characteristic variable defines the variables, parameters, criteria, or conditions to determine whether an item is detected in a particular zone. Operational characteristics may include the zone operating state of a zone, a comparison of a local zone number to some value X, be associated with a roller countdown timer of a zone, and/or the like. In some embodiments, the determination that one or more operational characteristic variables are satisfied may be used to determine the zone operating state for one or more zones. For example, in some embodiments, an operational characteristic variable is satisfied if the zone operating state of a selected zone is OFF. In still further embodiments, an operational variable is not satisfied if the zone operating state of a selected zone is ON. In certain embodiments, an operational characteristic variable may be satisfied if a roller countdown timer associated with a zone is expired and an operational characteristic variable may not be satisfied if a roller countdown timer associated with a zone is not expired. In still further embodiments, an operational characteristic variable may be satisfied if a local zone number is less than or equal to some value and may not be satisfied if the local zone number is greater than such value. The operational characteristic variables may be associated with a first zone, a second zone, or any number of zones and need not be associated with the same zone.

As used herein, the terms "data," "content," "digital content," "digital content object," "information," and similar terms may be used interchangeably to refer to data capable of being captured, transmitted, received, and/or stored in accordance with various embodiments of the present invention. Thus, use of any such terms should not be taken to limit the spirit and scope of embodiments of the disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, repeaters, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, repeaters, and/or the like.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The component may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated as software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multi-thread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

Further, terms like "user equipment," "user device," "mobile device," "mobile," "station," "access terminal," "terminal," "handset," and similar technology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such component are intended to correspond, unless otherwise indicated, to any component which performs the specified function of the described component (e.g., a functional equivalent), even though not structurally equivalent to the disclosed structure, which performs the function in the herein illustrated example aspect of the embodiments. In this regard, it will also be recognized that the embodiments comprises a system as well as a computer-readable medium having computer-executable instruction for performing the acts and/or events of the various methods.

Computing devices typically comprise a variety of media, which can comprise "computer-readable storage media" and/or "communications media," which two terms are used herein differently from one another as follows. "Computer-readable storage media" can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tapes, magnetic disk storage or other magnetic storage devices, or other tangible and/or non-transitory media which can be accessed by one or more local or remote computing devices, e.g., via access requests, queries or other data retrieval protocols, for a variety of operations with respect to the information stored by the medium.

On the other hand, "communications media" typically embody computer-readable instructions, data structure, program modules or other structure or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

System Architecture and Example Apparatus for Implementing Embodiments of the Present Disclosure Methods, apparatuses, systems, and computer program products of the present invention may be embodied by any of a variety of devices. For example, the method, apparatus, system, and computer program product of an example embodiment may be embodied by a networked device, such as a server or other network entity, configured to communicate with one or more devices, such as the one or more sensors or the one or more zone control modules associated with an accumulation conveyor. Additionally, or alternatively, the computing device or controller may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices. Still further, example embodiments may be embodied by devices utilizing IoT (Internet of Things) or IIoT (Industrial Internet of Things) technology. In still further embodiments, the method, apparatus, system, and computer program product of an example embodiment may be embodied in, have access to, or otherwise be associated with a gateway device or cloud-based platform.

Referring to FIG. 1, there is shown a diagrammatic plan view of an accumulation conveyor embodying one or more teachings of the present disclosure. Accumulation conveyor, generally indicated at 2, includes a plurality of zones 4*a*, 4*b*, 6*a*, 6*b*, 8*a*, 8*b*, 10*a*, 10*b* and 12*a*, which are individually controllable. Although in the embodiment depicted in FIG. 1 there are nine zones, the present invention is not limited to nine zones, or an odd or even number of zones. In the embodiment depicted, zones are generally three feet long, although they may be of any suitable length, such as six feet. In the embodiment depicted, zone control modules 4*c*, 6*c*, 8*c* and 10*c* each controls two zones, although a zone control module may control more than two zones or control only one zone, which discharges to conveyor 14. The number of zones that a single zone control module may control is not limited to the present invention.

In the embodiment depicted, each zone of accumulation conveyor 2 comprises one or more conveyor rollers (diagrammatically illustrated) defining a conveyor surface, which may be selectively driven such as by an underlying chain or a drive belt (not shown) urged against the conveyor rollers using one or more pneumatic actuators (not shown). In the depicted embodiment, each control module 4*c*, 6*c*, 8*c*, 10*c* and 12*c* is configured to control the one or more pneumatic actuators (not shown) of their associated zones, and is therefore connected to a pneumatic source. In some embodiments, the control modules 4*c*, 6*c*, 8*c*, 10*c* and 12*c* may be pneumatically daisy chained together. Other drive roller, and/or belt configurations or arrangements are also contemplated by this disclosure, including but not limited to, motorized driven rollers with control modules 4*c*, 6*c*, 8*c*, 10*c* and 12*c* configured appropriately therefor, or one or more control modules 4*c*, 6*c*, 8*c*, 10*c* and 12*c* encompassed within or associated directly with a roller, such that one or more rollers are further configured perform the functionality of a control module.

Each zone 4*a*, 4*b*, 6*a*, 6*b*, 8*a*, 8*b*, 10*a*, 10*b* and 12*a* includes respective sensors 4*d*, 4*e*, 6*d*, 6*e*, 8*d*, 8*e*, 10*d*, 10*e* and 12*d* that are connected to the respective control modules of the zones. In the embodiment depicted, the sensors are photo eyes with respective reflectors, although any suitable sensor may be used, such as roller sensors or diffused scan sensors. The positions and orientations of the sensors, also referred to herein as photo eyes, within the zones are selected based on the system parameters, such as length or type of packages. Although FIG. 1 is a diagrammatic illustration, sensors 4*d*, 4*e*, 6*d*, 6*e*, 8*d*, 8*e*, 10*d*, 10*e* and 12*d* are depicted as proximal the discharge end of each zone, such as about one foot from the discharge. Any suitable location may be used, such as proximal the feed end of each zone.

In the embodiment depicted, control modules 4*c*, 6*c*, 8*c*, 10*c* and 12*c* are networked together with controller 16, communicating data to controller 16 indicative of conditions of the plurality of zones 4*a*, 4*b*, 6*a*, 6*b*, 8*a*, 8*b*, 10*a*, 10*b* and 12*a*. Although a daisy chain configuration is depicted, any suitable network may be used. Similarly although controller 16 is depicted as being a single physical device, a controller in an embodiment of the disclosed technology could be implemented in other ways as well, such as in the form of multiple integrated physical devices, or multiple discrete physical devices which communication with each other and/or other devices via a network (e.g., a daisy chain network). That is, although a centralized controller is depicted in FIG. 1, this disclosure contemplates other configurations, such as multiple integrated or discrete physical devices which allow for e.g. a distributed plug-n-play type environment, wherein each separate controller or physical device executes similar control logic, such as accumulation logic or release rate logic, to control one or more accumulation conveyors 2.

Controller 16, which comprises at least one processor, comprises at least part of a processing system, which itself may have more than one controller, which executes processor-executable instructions to perform operations to control accumulation conveyor 2. In the embodiment depicted, logic for control of accumulation conveyor 2 is resident on controller 16, which executes instructions that implement the control logic. Each zone 4*a*, 4*b*, 6*a*, 6*b*, 8*a*, 8*b*, 10*a*, 10*b* and 12*a* has a respective settable operating speed that may be set by controller 16. Controller 16 may control more than one accumulation conveyor line. In some embodiments depicted, controller 16 executes instructions to implement the control logic of an embodiment of the present disclosure.

Aspects of the technology described herein can provide improved operating mode determination, thereby allowing the accumulation conveyor 2 to operate at a higher speed with a higher article density while providing gentle handling of articles at the higher speed. In existing, traditional modes, the local zone uses the status of the first downstream zone sensor to determine its own operating state. For example, in a traditional mode, if the downstream zone sensor is blocked, the operating state of the local zone is OFF, or else the operating state of the local zone is ON. This traditional mode is also known as 1-Zone accumulation logic, or colloquially as "singulation." As a result of this traditional 1-Zone accumulation logic, on a conveyor with a high density of boxes, the boxes flow through zones (which are turning on and off due to the above described traditional logic, blocking eyes or sensors, turning off, but then coasting past those eyes or sensors, causing the zones to turn back on) which starts to combine product into zone-size groups with an equal zone-size gap between each product group. Accumulation conveyors configured to utilize such traditional accumulation modes, which rely solely on the status of the first downstream zone sensor, are unable to decipher between when product is accumulating versus flowing. For example, in an instance where a product is just passing through a first downstream zone, such first downstream sensor may indicate that it is blocked. A blocked sensor may indicate that the associated zone is occupied.

Some embodiments of the present disclosure address the above-described disadvantages through an improved fundamental mode of operation, sometimes referred to or known in the industry as a type of 'accumulation logic' that can be performed via a circuit or software. The present disclosure can be used to implement such a control scheme, such as implemented by controller 16, that determines or sets a zone operating state or an operating mode associated with an individual zone based on the existence or satisfaction of two or more conditions or variables.

Figure 3:
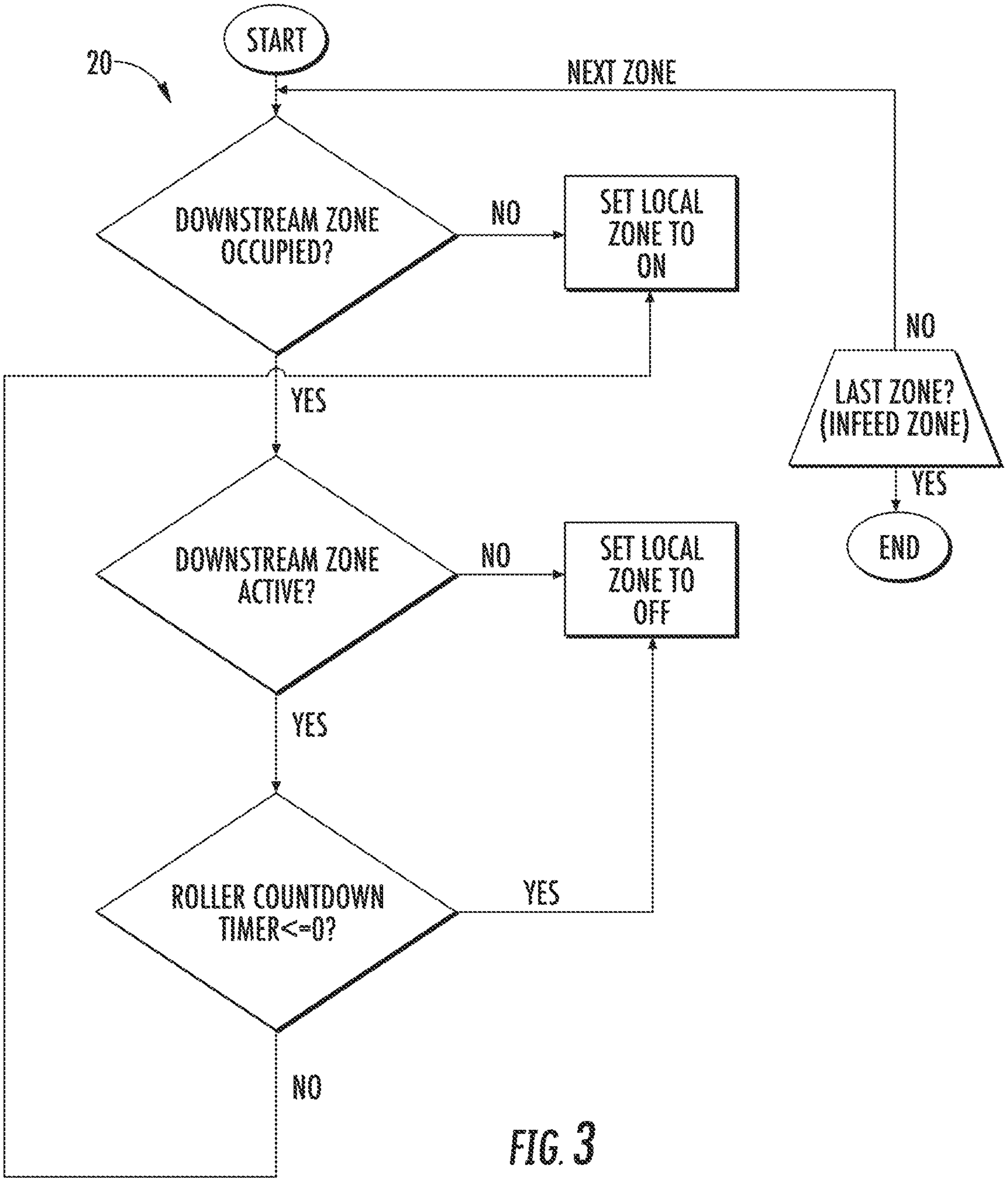
FIG. 3 illustrates a flow diagram of logic for determining the operating state of an individual zone in accordance with various aspects and embodiments of the subject disclosure.

Referring to FIG. 3, an improved accumulation logic 20 is shown, which may be applied to one or more zones of a plurality of zones of an accumulation conveyor 2. The individual zone that the accumulation logic 20 is examining or configuring is referred to herein as the local zone. In some embodiments, accumulation logic 20 may examine each of the plurality of zones, beginning with the zone which is furthest downstream of the plurality of zones and progressing upstream, which may be progressing consecutively upstream examining each zone, or which may be progressing sequentially upstream potentially skipping zones but still progressing in the upstream direction. In the embodiment depicted, accumulation logic 20 begins with the discharge zone, which is zone 12*a* of accumulation conveyor 2 of FIG. 1, and ends with the infeed zone, the upstream-most zone of the plurality of zones, which is zone 4*a* of FIG. 1. In some embodiments, the improved accumulation logic 20 used to control the accumulation conveyor 2 is encompassed by multiple integrated or discrete physical devices. In still further embodiments, the number of zones analyzed may only be a subset (e.g., 1, 2, 3, etc,) of the total plurality of zones forming the accumulation conveyor 2.

In accordance with one embodiment, a zone operating state associated with a local zone is set to inactive (e.g., OFF) in an instance where an item detection variable and an operational characteristic variable associated with a downstream zone are both satisfied. For example, the system is configured such that the status of the first downstream zone sensor and the operating state of the first downstream zone are used to configure the zone operating state of the local zone. Such downstream zone sensor data and downstream zone operating state are used to optimize or improve the overall operational performance of the accumulation conveyor 2. Zone sensor data is utilized to determine whether the zone associated with the selected sensor is occupied. As used herein, a zone is considered occupied when the sensor associated with that zone has given a signal indicating detection of an article (e.g., a blocked signal from a photo eye) for a period of time equal to or greater than a first delay period. The first delay period could be, for example, zero, 0.75 seconds, 1.0 seconds or 1.5 seconds. A zone which is considered occupied will be considered not occupied once the sensor is cleared (e.g., a photo eye is not blocked) for a period of time equal to or greater than a second delay period. The second delay period could be equal to or different from the first delay period, and could also be, for example, zero, 0.75 seconds, 1.0 seconds or 1.5 seconds. In some embodiments, an item detection variable is satisfied when the zone sensor data indicates the associated zone is occupied. For example, an item detection variable associated with a downstream zone is satisfied when a presence of an object on the conveyor is detected via the one or more sensors associated with the downstream zone.

In one embodiment, the accumulation logic 20 sets the initial or operational bias of each zone as enabled or active (e.g., ON or send control signals to the associated zone control module to activate or drive the one or more rollers associated with such zone) unless an exception is satisfied. For example, the system is configured such that the default zone operating state of the local zone is ON unless the first downstream zone is actually accumulated or flow has been impeded or jammed. In some embodiments, the controller 16 receives first downstream zone data comprising zone sensor data and zone operating state for the first downstream zone to the local zone. Thus, if the zone sensor data corresponding to an item detection variable indicates that the first downstream sensor is occupied (e.g., a blocked signal for requisite amount of time) and the zone operating state corresponding to an operational characteristic variable indicates that the first downstream zone's operating state is OFF, the zone operating state of the local zone is set to OFF or otherwise configured as inactive.

Additionally or alternatively, the zone operating state associated with a local zone is set to inactive (e.g., OFF) in an instance where an item detection variable associated with a downstream zone and an operational characteristic variable associated with the local zone are both satisfied. For example, the system is configured such that the status of the first downstream zone sensor and the status of the local zone's roller countdown timer are used to configure the zone operating state of the local zone. In some embodiments, in an instance wherein the operating state of an individual zone is set to OFF, a roller countdown timer is initiated and configured to count down from some value (e.g., zero, 1.5 seconds, 2.0 seconds, 2.5 seconds) to expiration (e.g., less than or equal to zero). The value is assigned such that the rollers should roll to a stop before expiration of the timer which may vary from zone to zone and conveyor to conveyor. The roller countdown timer ensures that the rollers associated with the selected zone have actually stopped rotating/spinning, as rollers continue to rotate for a period of time after the operating state of the associated zone is turned OFF and mechanical or pneumatic driving means are no longer supplied to such rollers. In further embodiments, the roller countdown timer is reset each time the operational state of the associated zone is set to ON. In still further embodiments, an individual zone's roller countdown timer begins to count down once the associated zone is set to OFF. In some embodiments, an item detection variable is satisfied when the zone sensor data indicates that the first downstream zone is occupied (e.g., a blocked signal from a first downstream zone sensor for a requisite amount of time) and an operational characteristic variable associated with the local zone is satisfied when the local zone's roller countdown timer has expired. In such embodiments, the zone operating state of the local zone is set to, or configured as, OFF. This embodiment allows for accumulation of product and ensures that upon restart, if the zone operating state of the local zone is OFF, it remains OFF unless and until the controller 16 sends a signal directing such local zone to start or to turn ON or the variable conditions change. In some embodiments, instead of analyzing the status of the first downstream zone sensor and the status of the local zone's roller countdown timer to configure the operating state of the local zone, the controller 16 is configured to allow for adjustment of a release rate timer as discussed further below.

In still further embodiments, the zone operating state of the local zone is set or configured based upon both the status of the first downstream zone sensor AND either the status of the first downstream zone's operating state OR the status of the local zone's roller-countdown-timer). For example, in some embodiments, if a downstream zone's sensor is blocked AND (the downstream zone's operating state is OFF OR the local zone's roller-countdown-timer<=0) then the local zone's zone operating state is set to OFF, else the local zone's operating state is set to ON. For example, the system is configured such that determining the zone operating state of the local zone may be based upon at least determining whether an item detection variable associated with the first downstream zone sensor is satisfied and determining whether at least one of two operational characteristic variables is satisfied. In some embodiments, a first operational characteristic variable is associated with the first downstream zone and is satisfied in an instance where the zone operating state of the first downstream zone is inactive or OFF. In some embodiments, a second operational characteristic variable is associated with the local zone and is satisfied in an instance where the local zone's roller countdown timer is expired. Thus, in some embodiments, each zone location's operational bias is ON except for the following situations: OFF if downstream sensor is blocked AND downstream mode is OFF; and OFF if downstream sensor is blocked AND local roller-countdown-timer is expired (where the roller-countdown-timer counts down from some value any time it's respective zone's operational state is OFF, and gets reset every time the operational state is ON, which ensures an OFF zone stays off except for a sensor change on release).

In some embodiments, the status of the downstream zone operating state and the status of the local zone roller countdown timer are considered zone status data. Thus, in some embodiments, an operational characteristic variable is satisfied when the zone status data indicates the downstream zone is OFF or inactive. In still further embodiments, an operational characteristic variable is satisfied when the zone status data indicates the local zone's roller countdown time is expired. Upon determining the zone operating state associated with the local zone is to be set to inactive in an instance where both the item detection variable and at least one operational characteristic variable are satisfied, a command signal with the appropriate inactivation signal is transmitted to a control module associated with the respective local zone. A table further setting forth this logic is demonstrated in Table 1.

TABLE 1

| Local Zone Operating State | Downstream Zone Presence Detected | Downstream Zone Operating State | Status of Local Zone Roller Countdown Timer |
|---|---|---|---|
| ON | FALSE | OFF | EXPIRED (≤0) |
| ON | FALSE | OFF | NOT EXPIRED (>0) |
| ON | FALSE | ON | EXPIRED (≤0) |
| ON | FALSE | ON | NOT EXPIRED (>0) |
| ON | TRUE | ON | NOT EXPIRED (>0) |
| OFF | TRUE | OFF | EXPIRED (≤0) |
| OFF | TRUE | OFF | NOT EXPIRED (>0) |
| OFF | TRUE | ON | EXPIRED (≤0) |

The disclosed accumulation mode can decipher between when product is accumulating vs. flowing using the basic idea "if downstream is going, then go full speed" and its net effect with each zone doing this same test keeps the flow going. In the embodiment shown in FIG. 3, accumulation logic 20 is re-executed for the next upstream zone, continuing until all zones have been examined. In other embodiments, the accumulation logic 20 is executed with respect to one or more zones, but not necessarily all of the zones of an accumulation conveyor 2. In still further embodiments, the accumulation logic 20 is tested continually, beginning at the discharge zone again. This separation of accumulation vs. release finally allows certain combinations of product handling and routes to co-exist naturally, without having the same level of trade-offs that have existed in the past and without stacking operational modes. Costs savings through less setup, more operational efficiency and performance to customers is achieved. Accordingly, on a conveyor with a high density, the boxes flow through the zones (that are no longer turning on and off) meaning the infeed stays full speed, and accumulation only occurs where it's actually accumulated (off and blocked).

Additionally or alternatively, in still other embodiments, it is contemplated that the zone operating state of the local zone is set to OFF if the first downstream sensor is blocked AND local zone number is less than or equal to X, wherein X is some value greater than or equal to 1 and represents the number of zones to which this aspect of the accumulation logic 20 may be applied. Such embodiments prevent runaway on release. For example, the system is configured such that the status of the local zone's first downstream zone sensor and a comparison of the local zone's assigned zone number to a threshold range may be used to configure the operating state of the local zone and allow for release of product zone by zone, or groups of zone by groups of zones in some embodiments, instead of all at once. Accordingly, in some embodiments, the zone operating state associated with a local zone is set to inactive or OFF in an instance where an item detection variable associated with a downstream zone and an operational characteristic variable associated with the local zone are both satisfied. In some embodiments, an operational characteristic variable associated with the local zone is satisfied when the zone status data indicates the local zone number is less than or equal to X. For example, in some embodiments, to empty out an accumulation conveyor 2, the controller 16, applying the accumulation logic 20, sends a release signal to the zone control modules. The release signal enables, activates, otherwise turns ON the furthest downstream zone. This zone is assigned a local zone number of one (local zone number=1). To avoid releasing all zones at once which may result in a product runaway on release, in some embodiments, the controller 16, applying the accumulation logic 20, proceeds to assign a local zone number to each zone in a plurality of zones upstream of local zone number one, progressively increasing by one for each zone upstream from such zone. For example, in some embodiments, as the product in local zone number one proceeds downstream on the accumulation conveyor 2 in response to receiving a release signal, the other zones assigned local zone numbers equal to or less than X will remain in OFF mode, unless and until the status of the first downstream sensor to the particular local zone indicates that it is no longer blocked or occupied. A table further setting forth this logic is demonstrated in Table 2.

TABLE 2

| Local Zone Operating State | Downstream Zone Presence Detected | Local Zone Number |
|---|---|---|
| ON (unless an embodiment comprises other applicable logic defining the local zone operating state) | FALSE | Local Zone Number > X |
| ON (unless an embodiment comprises other applicable logic defining the local zone operating state) | TRUE | Local Zone Number > X |
| ON (unless an embodiment comprises other applicable logic defining the local zone operating state) | FALSE | Local Zone Number ≤ X |
| OFF | TRUE | Local Zone Number ≤ X |

Accordingly, in some embodiments wherein the local zone number of a local zone is greater than X, the zone operating state of such local zone is set to active such that the local zone is ON. In certain embodiments, the zone operating state of the local zone may otherwise be subject to other control logic parameters. In a non-limiting exemplary example wherein X is 5 and the local zone number is determined to be 9, if the embodiment employed only the above identified local zone number logic, the zone operating state of the zone associated with local zone number 9 would be set to active such that local zone number 9 is ON. In another non-limiting example wherein additional accumulation logic is employed, such as a status of a downstream sensor and zone operating state of the first downstream zone, the zone operating state of the zone associated with local zone number 9 would be dependent not on the above identified local zone number logic, but rather logic relying upon a status of a downstream sensor and the zone operating state of the first downstream zone, such as set forth in Table 1. The provided examples are non-limiting and it is contemplated that a zone or plurality of zones may be subject to one or more control logic embodiments disclosed herein.

In some embodiments, instead of analyzing the status of the first downstream zone sensor and the local zone number to configure or set the zone operating state of the local zone, the controller 16 is configured to allow for adjustment of a release rate timer as discussed further below.

Additionally or alternatively, in still further embodiments, it is contemplated that the zone operating state of the local zone is set to OFF if the local zone is blocked and the downstream zone's pre-jam-countdown-timer is less than or equal to zero (pre-jam timer≤0), thereby effectively dropping or adjusting the accumulation logic applied to the local zone to a traditional 1-Zone accumulation logic, while allowing a potential jam downstream to clear and lowering the back pressure on a real jam so that such jams may be dislodged easier. In some embodiments, the system is configured such that the zone operating state of the local zone is set to OFF when a potential jam immediately downstream is detected. Accordingly, in some embodiments, the zone operating state associated with a local zone is set to inactive such that the local zone is turned OFF in an instance where an item detection variable associated with the local zone and an operational characteristic variable associated with the downstream zone are both satisfied. For example, an item detection variable associated with the local zone is satisfied when a presence of an object on the conveyor is detected by one or more sensors associated with the local zone. Additionally, in some embodiments, an operational characteristic variable associated with the downstream zone is satisfied when the zone status data indicates a pre-jam timer associated with the downstream zone is expired (e.g., less than or equal to 0). A table further setting forth this logic is demonstrated in Table 3.

TABLE 3

| Local Zone Operating State | Status of Downstream PreJam Timer |
|---|---|
| ON (unless embodiment comprises other applicable logic defining the local zone operating state) | NOT EXPIRED (>0) |
| OFF | EXPIRED (≤0) |

In some embodiments, a local zone's prejam timer begins to count down from a predetermined value each time its first downstream zone's sensor is not blocked AND the local zone's own sensor is blocked AND the local zone's first upstream sensor is blocked. For example, the local zone's prejam time may be activated in an instance where the first downstream's zone sensor is not blocked and the local zone's sensor and the local zone's first upstream sensor are both blocked. In still further embodiments, the local zone's pre-jam timer gets reset in every other condition. For example, a local zone's pre-jam timer is configured to activate each time zone sensor data indicates that item detection variables associated with each of the local zone and a first upstream zone are satisfied and an item detection variable associated with a first downstream zone is not satisfied. In some embodiments, a pre-jam countdown timer is assigned a value (e.g., 2.5 second, 3.5 seconds, 5 seconds, or an amount of time pre-calculated to correspond to the time it takes product to traverse a certain number of zone lengths at full speed) from which it counts down to expiration (e.g., <=0). A table further setting forth this logic is demonstrated in Table 4.

TABLE 4

| Status of Local Zone Prejam Timer | Downstream Zone Presence Detected | Local Zone Presence Detected | Upstream Zone Presence Detected |
|---|---|---|---|
| COUNTDOWN | FALSE | TRUE | TRUE |
| RESET | | ALL OTHERS | |

Accordingly, in certain embodiments, the pre-jam timer associated with a zone is initiated or activated in instances wherein the first downstream sensor is NOT blocked AND the local sensor is blocked AND the first upstream sensor is blocked. In still further embodiments, the pre-jam timer is reset in every other condition. In such embodiments, the zone operating state of a local zone is set to OFF when the pre-jam timer associated with the first downstream zone has expired. For example, when the pre-jam timer associated with the first downstream zone is less than or equal to zero, the zone operating state of the local zone is inactivated. In such instances, a jam may be occurring in such first downstream zone. For example, the controller 16 detects a jam may be forming in this embodiment because sensors associated with each of the local zone and the first upstream zone indicate they are occupied without detecting any gap between product (e.g., blocked for extended period of time), however, the first downstream zone may be ON but with no product flowing. The pre-jam timer is initiated upon detection of this situation and upon expiration of such timer, the first zone upstream of the potential jam is turned OFF. In some embodiments, the accumulation logic 20 reverts to the traditional 1-Zone or singulation mode of accumulation in this instance, relying on only the status of the first downstream sensor to determine the zone operating state of the local zone. In such instances, the zone operating state of the local zone will be enabled, activated, or otherwise turned ON once the first downstream sensor is not blocked.

In some embodiments, if the local zone being examined is the discharge zone or the most downstream zone physically, the accumulation logic 20 may be configured such that an additional virtual zone is established downstream of the discharge zone wherein the status of the virtual sensor associated with the virtual zone is defined as occupied and blocked, the zone operating state of the virtual zone is defined as OFF such that it is not actively running, and the virtual zone's downstream zone is defined as itself. Such a virtual zone with defined item detection variables and operational characteristic variables improves the accumulation logic 20 in some embodiments.

Additionally, although embodiments discussed herein generally disclose an improved, smarter version of 1-Zone accumulation or singulation, it is contemplated that the disclosed embodiments may apply to any other traditional types of accumulation mode, such as 0&1-Zone accumulation logic, 1&2-Zone accumulation logic, 2-Zone accumulation logic, etc., with appropriate modifications. For example, an improved 0&1-Zone accumulation logic may be configured to determine whether a first item detection variable associated with a first zone (e.g., local zone) is satisfied, whether a second item detection variable associated with a second zone (e.g., a downstream zone) is satisfied, and whether at least one of two operational characteristic variables is satisfied, and in an instance where both the item detection variable and at least one operational characteristic variable are satisfied, set a zone operating state associated with the first zone to inactive. In an exemplary, non-limiting example, an accumulation conveyor applying such an improved 0&1-Zone accumulation logic may be configured to stop or otherwise turn OFF a local zone if the sensor associated with the local zone is blocked (e.g., the 0-zone is blocked), the sensor associated with the first downstream zone is blocked (e.g., the 1-zone is blocked) and at least one operational characteristic variable, such as the zone operating state of the downstream zone is OFF, is satisfied.

As indicated above, existing efforts to adjust the aggressiveness of accumulation of product have proven to be complicated and non-intuitive. Adjusting the aggressiveness of accumulation adjusts how hard or soft product hits other product as its slowing down on a conveyor. The determination of which operational mode or combination or "stack" of operational modes will result in more or less aggressiveness than another mode or configuration of modes has traditionally been difficult and prone to error. Accordingly, additionally or alternatively, in another embodiment, an accumulation conveyor can be configured to have tunable accumulation aggressiveness. As such, this present disclosure discloses an example method to adjust the aggressiveness of accumulation simpler using a tuner. The tuner allows for cost savings, in some examples, through less setup, and more operational efficiency and better performance is achieved.

Some example embodiments of the present disclosure achieve these breakthroughs through an aggressiveness configuration interface referred to as a wizard in some examples, that asks questions in order to obtain initial values and/or settings (from a lookup table) and then transfers those values into a linear equation controlled by a user-adjustment mechanism. This mechanism stacks or combines one or more operational modes to form a linear, consistent sequence of values which is configured to make accumulation increasingly harsh in one direction and increasingly soft in the other direction, sometimes changing or adjusting multiple values (e.g., 7) at once.

In one embodiment, an accumulation conveyor 2 may be associated with an aggressiveness configuration interface. In some embodiments, the aggressiveness configuration interface is configured such that it allows using the conveyor data input received from a user in response to questions found in the configuration interface, to define certain configuration variables, such as Conveyor Speed, Average Zone Length, Type of Package, Average Package Weight (for Live Load), etc. In a non-limiting exemplary example, certain embodiments comprise outputting or rendering an aggressiveness configuration interface to a controller user interface associated with the controller 16, wherein the aggressiveness configuration interface comprises an interactive interface configured for user engagement via the controller user interface. In some embodiments, the interactive interface is configured for displaying queries and receiving user data input in response to such queries. According to various embodiments, the controller user interface associated with the controller 16 may be any type of display or user interface capable of portraying data associated with the controller 16 such as the display of a smart phone, tablet computer, laptop computer, wearable, personal computer, and the like. Such an aggressiveness configuration interface can be provided via software in some embodiments. The confirmation interface can be provided via hardware in other embodiments. The configuration interface can be provided via a combination of software and hardware in still further embodiments.

Combined with standardized lookup tables, in some embodiments, the accumulation conveyor 2, such as via the controller 16, is configured to analyze the received conveyor data input and query an accumulation settings repository for accumulation settings based upon at least the conveyor data input. That is, the controller 16 receives conveyor data input associated with user engagement of the aggressiveness configuration interface and queries an accumulation settings repository based upon at least the conveyor data input. The accumulation settings repository comprises aggressiveness parameters including, but not limited to, acceleration values, deceleration values, zone length, neighborhood size, accumulation models, prior accumulation installation models, etc. In some embodiments, the accumulation setting repository comprises an application guideline, which demonstrates recommendations from prior installations experience and models of product behavior, in order to determine which parameters should be enabled or disabled (such as Neighborhood Mode, Dynamic AutoSlug), what Acceleration and Deceleration should be set to, what Zone Length should be set to, and calculate the size of the Neighborhood to otherwise determine how many zones would be pulsing (e.g., turning ON and OFF) behind or upstream of an accumulated zone. Also, based on the above conveyor data input (namely Avg Zone Length) and the Accumulation Aggressiveness Slider value, the accumulation mode (e.g., accumulation logic) is auto-selected.

Based upon at least the accumulation settings returned by the query and the conveyor data input, the controller 16 determines an initial accumulation mode. Based upon the accumulation settings returned by the query, the controller 16 programmatically generates an aggressiveness linear equation and assigns an aggressiveness value associated with the initial accumulation mode as a default value of the linear equation.

Figure 5:
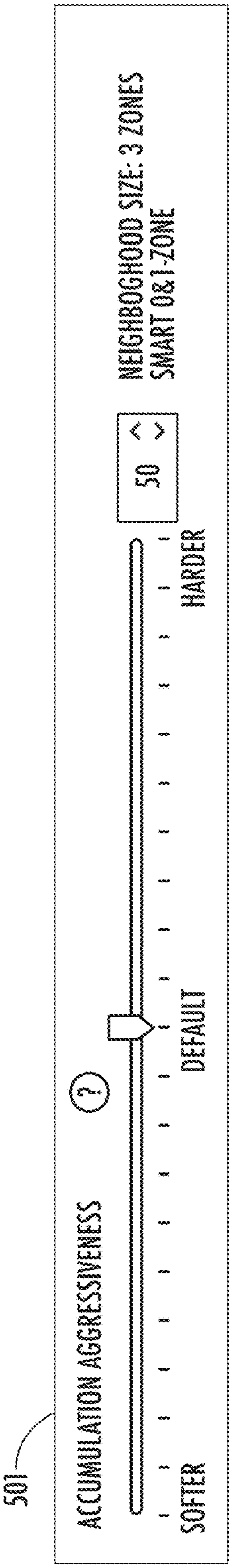
FIG. 5 illustrates an example aggressiveness interface object in accordance with various aspects and embodiments of the subject disclosure.

In a further non-limiting exemplary example, the controller 16 further configures an aggressiveness interface object 501 based upon at least the aggressiveness linear equation and the assigned default value and renders or outputs the aggressiveness interface object 501 to the controller user interface. In some embodiments, the aggressiveness interface object 501 is a user-adjustable mechanism such as a sliding tuner, that is configured to increase and decrease the aggressiveness of the accumulation in accordance with and in response to detecting user engagement of the user-adjustable mechanism. In such embodiments, the system may be configured such that it includes an adjuster/slider for aggressiveness. For example, the neighborhood size determined in association with the aggressiveness configuration interface or wizard may be set to the "Accumulation Aggressiveness" slider value of 50, the slider value ranging from 0-100. In such example embodiment, the conveyor system is configured to treat packages softer on accumulation by lowering the slider value or harsher on accumulation by increasing that slider value. The system is configured such that the user is able to adjust the aggressiveness of the impact of the accumulation on a sliding scale to which the user can relate in a linear fashion as opposed to attempting to configure and stack multiple operational modes, some of which are logarithmic and thus are less intuitive when attempting to increase or decrease aggressiveness. The aggressiveness interface object 501 is depicted as a user-adjustable mechanism in a slider formation in FIG. 5, but other configurations are also contemplated, including but not limited to, a physical knob, up/down indicators, digital display, keystroke entry, or any other configuration that can be rendered, expressed, or provided in a physical, touchable control.

In some embodiments, it is contemplated that the default accumulation mode is set to the improved and smarter 0&1-Zone accumulation logic corresponding to the present disclosure, which compacts product well but is also more aggressive. In such embodiments, in an instance wherein the user-adjustable mechanism associated with accumulation aggressiveness is adjusted below a minimum aggressiveness threshold, the controller 16 reverts to the improved, smarter, and less aggressive 1-Zone accumulation logic described herein in an effort to ensure the product is slowed down accordingly.

In still other embodiments, it is further contemplated that in instances wherein the user-adjustable mechanism associated with accumulation aggressiveness is adjusted below a minimum regulator threshold, the controller 16 adjusts, to a lower value, the minimum time that an air regulator is on (e.g., MinRegOn) so that the pneumatic actuators driving the rollers are able to pulse on for lesser amounts of time, thereby lessening the aggressiveness of such accumulation.

In some embodiments, the neighborhood size can be adjusted as a result of changes in the settings or value of accumulation aggressiveness. For example, in some embodiments, the accumulation conveyor 2 uses data input by a user or variable(s) determined by the controller itself to calculate the initial size of a neighborhood, such as v1_nhood_size, according to a traditional or original neighborhood mode algorithm. For example, in some embodiments, the neighborhood size is determined based upon at least the length of zones, acceleration and deceleration values, etc. In still further embodiments, an accumulation conveyor 2, such as via the controller 16, can determine or adjust the neighborhood size using alternative neighborhood v2 algorithms. In some embodiments, the size of the determined neighborhood can be adjusted based on the slider using such variables as hardest_mult (corresponding to a multiplier value), hardest_tick (corresponding to the highest tick mark or value on a slider), min_adder (corresponding to an additive value), accum_delay_max, and accum_delay_min_adder (corresponding to an additive value), one or more of which may be found in a lookup table. This improved method for calculating the neighborhood size stops using the traditional or original neighborhood mode algorithm directly, and instead labels each zone upstream of an accumulated zone an index number up to the neighborhood size. For example, as the aggressiveness is lowered, the size of the neighborhood is increased such that the speeds of additional zones upstream of the local zone are configured to allow for the product to slow down sooner and over a greater distance, thereby resulting in a softer impact of product as it comes to a stop. In such instances, more upstream zones are pulsing or otherwise accepting control as part of the determined neighborhood. In instances where the aggressiveness is increased, the size of the neighborhood is decreased such that less zones are pulsing. Thus, in some embodiments, in response to detecting an indication to adjust the aggressiveness level of the accumulation conveyor 2, the controller 16 is configured to programmatically adjust the speeds or rates of one or more zones upstream of the local zone. In still further embodiments, in response to detecting an indication to decrease the aggressiveness level of the accumulation conveyor, the controller 16 is configured to programmatically lower the speeds or rates of one or more zones upstream of the local zone. In still further embodiments, in response to detecting an indication to increase the aggressiveness level of the accumulation conveyor, the controller 16 is configured to programmatically increase the speeds of one or more zones upstream of the local zone.

To determine the appropriate speed setting for one or more upstream zones in a neighborhood, some embodiments comprise querying speed parameters associated based upon at least the index number. For example, the index number may then be used to retrieve a respective pre-calculated linear speed_factor value (or percentage of full_speed) for that associated index number. For example, in some embodiments, the accumulation conveyor 2 determines a speed, or rate of velocity, for a selected zone by multiplying that retrieved speed_factor value by that selected zone's max speed, then put in the zone's Speed Regulator, and each of the neighborhood zones comprising a valid or associated index value are now pulsing. A speed regulator associated with a zone can be used in some embodiments to calculate a periodic duty cycle to vary the ON-time (e.g., activated) and OFF-time (e.g., deactivated) of a constant speed driving mechanism in a conveyor, such that the percentage of applied driving force to the one or more rollers in a zone is varied in order to alter the speed of the product on the one or more rollers.

In some embodiments, for certain harsher slider values when the neighborhood size is zero (0), a zone that normally would shut OFF due to accumulation, instead is configured according to a linearly increasing accumulation delay value. For example, a linearly increasing accumulation delay value allows the rollers associated with a zone to stay on a bit more after accumulation, thereby increasing the harshness of accumulation. For certain softer slider values, in some embodiments, the logic decreases the Speed Regulator's "minimum regulator ON time" in order to soften the lower speed pulsing effect. In some embodiments, the decrease is determined linearly. This disclosure contemplates other methods of decreasing the "minimum regulator ON time," such as logarithmically.

Accordingly, in certain embodiments wherein the improved accumulation logic 20 comprises the adjusted neighborhood size and linearly increasing accumulation delay embodiments described herein, the adjusted neighborhood size and the accumulation delay, v2_nhood_size and accum_delay respectively, may be determined based upon an associated value of the Accumulation Aggressiveness adjustable mechanism or slider. In a non-limiting example, if the sum of the initial neighborhood size determined under the traditional or original neighborhood mode algorithm and a knob factor that depends on the value of accum_slider_tick, which is the associated value of the Accumulation Aggressiveness adjustable mechanism or slider is greater than or equal to 0, the adjusted neighborhood size may be calculated as the sum of the initial neighborhood size and the whole number ceiling of the knob factor value. In such an embodiment, the accumulation delay may be defined as 0. In a further non-limiting example, if the sum of the initial neighborhood size and the knob factor is less than 0, the adjusted neighborhood size may be defined as 0 and the accumulation delay may be determined based upon one or more variables, such as delay time at speed, delay speed, lane speed ips (wherein speed may be measured in inches per second in some embodiments), hardest tick, start accum tick and accum slider tick. By way of non-limiting example, determining the accumulation delay value is given by the following formula:

$$\text{accum\_delay} = \big((\text{delay\_time\_at\_speed} * \text{delay\_speed})/\text{lane\_speed\_ips}\big)/ ((\text{hardest\_tick} - \text{start\_accum\_tick}) * (\text{accum\_slider\_tick} - \text{start\_accum\_tick}))$$

In some embodiments, the knob factor is associated with the value of the associated value of the Accumulation Aggressiveness adjustable mechanism or slider (i.e., accum_slider_tick). In such embodiments, a start accum delay tick is assigned the slider tick value at which the accum delay starts being applied to a particular zone. By way of non-limiting examples, determining the knob factor value and the accum delay start tick value, respectively, are given by the following formulas:

$$\text{knob\_factor} = \big[\big(\text{accum\_slider\_tick} - (\text{hardest\_tick}/2)\big) * \text{hardest\_mult} * 2\big]/\text{hardest\_tick}$$

$$\text{accum\_delay\_start\_tick} = (\text{hardest\_tick}/2) + \text{accum\_delay\_min\_adder} - \big[(\text{hardest\_tick} * \text{v1\_nhood\_size})/(\text{hardest\_mult} * 2)\big]$$

In still further embodiments, the speed or speed at index associated with an indexed zone associated with the adjusted neighborhood size and located upstream of an accumulated local zone can be determined. For example, in a non-limiting embodiment, if the speed denominator is equal to 0 OR a calculated speed at index is greater than lane speed measured in inches per second OR a calculated speed at index is less than 0, the speed at index may be set to the lane speed measured in inches per second. In still further embodiments, the speed at index may be set to the calculated speed at index. By way of non-limiting examples, determining the calculated speed at index and the speed denominator, respectively, are given by the following formulas:

$$\text{calculated\_speed\_at\_index} = \text{lane\_speed\_ips} * (\text{zone\_nhood\_index} + \text{min\_adder})/\text{speed\_denominator}$$

$$\text{speed\_denominator} = \text{v1\_nhood\_size} + \text{knob\_factor} + \text{min\_adder} + 1$$

In a non-limiting exemplary embodiment, the accumulation conveyor 2 may store certain variables at defined values. For example, hardest_tick, corresponds to or represents the highest tick mark on an associated slider and may be set to any value. For example, in some embodiments, the hardest_tick may be set to 100. In some embodiments, hardest_mult is a multiplier and may be set to any value. For example, in some embodiments, the hardest_mult may be set to −7.5. In still further embodiments, min_adder and accum_delay_min_adder are each additive values. In some examples, min_adder may be set to 2 and accum_delay_min_adder may be set to 5. In certain embodiments, accum_delay_at_speed is the amount of time, measured in seconds, that it takes for a particular type of roller/bearing combination to spin down at accum_delay_speed. In another non-limiting exemplary embodiment, accum_delay_at_speed may be set to 2 seconds and accum_delay_speed may be set to 48 inches per second.

In other embodiments, it is contemplated that for certain areas of the conveyor that are known to accept mini-slugs of product or groupings of X number of zones worth of product, the number of zones with the same index can be extended to X+gap worth of zones, until it moves onto the next index with its own respective X+gap worth of zones, etc up to neighborhood size. For example, in some embodiments, a mini-slug of product may span more than one zone. In such instances, the controller 16 is configured to adjust the speed of upstream zones by groups of zones instead of just by individual zone. For example, an index number may be associated with one or more zones.

In another embodiment, a release rate tunable accumulation conveyor is disclosed. The release rate is a function of the amount of inserted gap in between each zone as it releases. Traditionally, there is no easy way to tweak the release rate of an accumulation conveyor into whatever is downstream (whether it be a merge or another conveyor going at different rates) without also negatively affecting how it accumulates and handles product. The traditional method to adjust the release rate is to change the accumulation mode to change the release rate, or add some of the other stackable features found in products such as ZoneFlex® Advanced, but those modes and features interfere with each other's purposes (some are for release, but affect accumulation, or vice versa). For example, in traditional accumulation conveyors, the release rate is not separately adjustable from the accumulation aggressiveness. Today, a conveyor, and the logic surrounding it, does not know the difference between zones that are releasing or accumulating.

Figure 6:
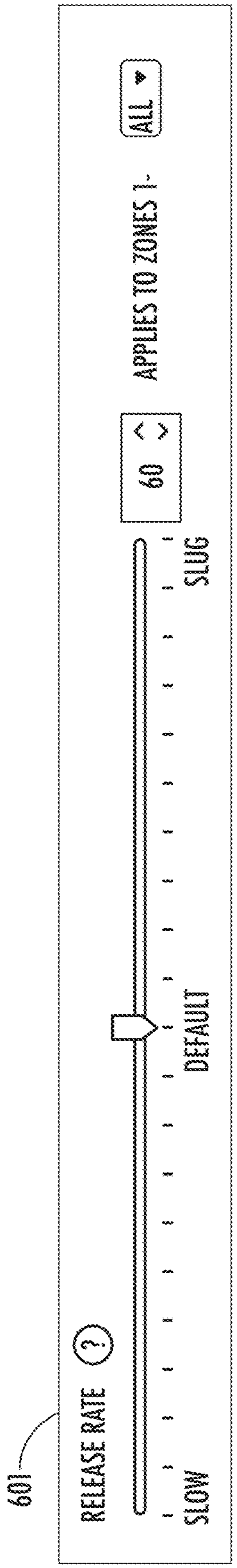
FIG. 6 illustrates an example release rate interface object in accordance with various aspects and embodiments of the subject disclosure.

In some embodiments, the accumulator conveyor can pre-calculate one or more release rate sliders that are user adjustable (in hardware or software), where the value relates to the rate (e.g., possibly in percentage) that the user wants the conveyor to release at. For example, in one embodiment, the tunable release rate accumulation conveyor can have an interface with one or more user adjustable sliders or knobs that change the amount of gap between the release of each zone (by using a timer configured by the configured speed of the conveyor when engaged) so that it directly and linearly changes the 'carton feet per minute' that releases from the accumulation conveyor. For example, in some embodiments, the controller 16 is configured to render or output one or more release rate interface objects 601, i.e, user-adjustable mechanisms such as a sliding tuner, to the controller user interface that are configured to increase and decrease the release rate in accordance with and in response to detecting user engagement of the user-adjustable mechanisms. The exemplary release rate interface object of FIG. 6 is depicted as a slider, but other configurations are also contemplated, including a knob, up/down indicators, digital display, keystroke entry, etc. Thus, in some embodiments, in response to detecting an indication to adjust the release rate level of the accumulation conveyor (e.g., via the release rate interface object 601), the controller 16 is configured to generate a release rate timer based upon at least a configured speed of the corresponding zone. The accumulation conveyor 2, via the controller 16, only releases the next upstream zone upon expiration of the release rate timer. In an exemplary, non-limiting example, a slider value of 50% will equate to a timer that inserts 36 in of gap after releasing a 36 in zone of product and before releasing the next zone, where a slider value of 100% will have 0 in of gap between each zone. In embodiments using percentages, the controller 16 configures the release rate timer (e.g., smart_release_scans time) by converting the user input received via user adjustment of the Release Rate slider into how much time in between each zone's releases to equal that percentage of release rate. In one exemplary, non-limiting embodiment, if it takes 0.95 secs for a zone length of product to pass through a zone at the conveyor's full speed, and the slider is set to 75% release rate, then gap is calculated to be 0.32 seconds. That is, 0.95 s/0.75-0.95 s)=0.32 sec. Although slider value percentages are discussed, other configurations are also contemplated by this disclosure including a direct relation to carton feed per minute or a generated sliding scale. In some embodiments wherein the improved accumulation logic 20 and the release logic are both employed, the release logic may replace and/or override the portion of the accumulation logic 20 related to the roller countdown timer that prevents runaway on release. In such embodiments, the system is configured such that the release logic controls the release rather than the roller countdown timer controlling the release.

In some embodiments, the accumulator conveyor 2 also has the optional ability to estimate the amount of air/compaction already present in each zone as it's being released, so that, on the fly, it adjusts the next gap upstream so as to best meet the rate requested, even in the part of the zone that is not monitored by the sensor (that is located downstream of it).

In some embodiments, the accumulator conveyor 2 is also configured to have the optional ability for a user to delineate different areas of zones of the conveyor that associate with each of these Release Rate sliders For example, the system is configured such that the controller 16 configures the accumulation conveyor to have the ability to have more than one area where release rate is different. For example, a user may desire to have a faster rate toward the discharge, but more gap to accumulate nicer upstream handling.

In still further embodiments, the accumulator conveyor is also configured to have the ability to release in groups in certain areas, but not in others. For example, it may be helpful in keeping mixed product together when re-indexing them forward (most problems comes from accumulation, so said product is just moving forward a few zones, then it's better to keep the already accumulated product as a group, and move the whole group together). As such, in some embodiments the user delineates these different areas controlled by different Release Rate sliders to have different size groupings of zones that release together as if they are one big zone, and which all zones except the most downstream have their smart_release_scans time set to 0 sec (meaning it releases with the downstream zone together).

In still further embodiments, the accumulator conveyor 2 may label or otherwise identify each zone if the smart_release_scans time is less than the standard time it takes for the tail of product in a zone turned on to reach the photoeye. For example, such zone may be identified as having a pre-photoeye release. If smart_release_scans time is more than that standard time it takes for the tail of the product to reach the photoeye in that zone, the system may be configured to identify such zone as having post-photoeye release. For example, the system is configured such that the controller 16 is configured to determine whether the release rate timer (e.g., smart_release_scans time) is less than the standard time it takes for the tail of product in an enabled, activated, or otherwise turned ON zone to reach the photo eye sensor. If the controller 16 determines that the release rate time is less than the standard time, the controller identifies such zone(s) as a pre-photoeye release. If the controller 16 determines that the release rate time is more than the standard time, the controller identifies such zone(s) as a post-photoeye release.

In such embodiments where it is determined that the release rate time is more than the standard time it takes for the tail of the product to reach the photo eye sensor (e.g., a post-photo release zone), the controller 16 is configured to estimate the amount of air or gaps between product in the whole zone (e.g., small amount of air/gaps signals higher compaction) by using part of the zone that the product will pass through as a likely model of the whole zone's compaction. The controller 16 is configured to monitor the amount of time the subject zone's sensor is blocked or clear and extends or extrapolates that ratio to the rest of the zone that the sensor is not able to monitor due to its positioning.

In some embodiments, release logic is applied to one or more zones of a plurality of zones of an accumulation conveyor 2. As with the accumulation logic 20 discussed above, the individual zone that the release logic is examining or configuring is referred to herein as the local zone. In some embodiments, the controller 16 is configured to run both the release logic and the accumulation logic 20. In other embodiments, the controller 16 is configured to run only accumulation logic 20. In other embodiments, the controller 16 is configured to run only release logic.

The release logic is configured such that each zone's operational state bias is ON, however, the release logic is configured to set the zone operating state of the local zone to OFF in a number of embodiments. In one such embodiment, the release logic configures the operating state of the local zone to OFF if the local zone is determined to be pre-photoeye release, the status of the sensor associated with the local zone is occupied, the operating state of the first downstream zone is ON, the status of the sensor associated with the first downstream zone is occupied, and the time from when the downstream zone is turned ON is less than the release rate timer associated with the local zone. A table setting forth this logic is demonstrated in Table 5.

TABLE 5

| Local Zone Operating State | Local Zone Determined Pre-Photoeye Release | Local Zone Presence Detected | Downstream Zone Operating State | Downstream Zone Presence Detected | Time Downstream Zone ON < Local Zone Release Rate Timer |
|---|---|---|---|---|---|
| OFF | TRUE | TRUE | ON | TRUE | TRUE |
| ON | TRUE | FALSE | ON | TRUE | TRUE |
| ON | TRUE | FALSE | OFF | TRUE | TRUE |
| ON | TRUE | FALSE | OFF | FALSE | TRUE |
| ON | TRUE | FALSE | OFF | FALSE | FALSE |
| ON | TRUE | TRUE | OFF | TRUE | TRUE |
| ON | TRUE | TRUE | OFF | FALSE | TRUE |
| ON | TRUE | TRUE | OFF | FALSE | FALSE |
| ON | TRUE | TRUE | ON | FALSE | TRUE |
| ON | TRUE | TRUE | ON | FALSE | FALSE |
| ON | TRUE | TRUE | ON | TRUE | FALSE |

In some embodiments, the release logic configures the zone operating state associated with a local zone that is further associated with a scan timer, which is activated once a first downstream zone is enabled, activated, otherwise set to ON, thereby pulling product away from the local zone, which is still set to OFF and is not moving. In such embodiments, a zone operating state associated with a local zone is enabled, activated, otherwise set to ON and starts to move in an instance where an item detection variable associated with the first downstream zone is not satisfied AND a scan time value associated with the local zone satisfies a scan threshold. For example, the system is configured such that the status of the first downstream zone sensor and the scan timer are used to configure the zone operating state of the local zone in such embodiments. For example, the scan time value associated with the local zone satisfies a scan threshold when the scan time value is greater than or equal to a smart release scan value determined by the accumulation conveyor 2. The smart release scan value corresponds to a period of time measured in scans between each zone being activated such that a requested rate of the accumulation conveyor 2 is obtained. By way of non-limiting example, determining the smart release scan value for a local zone is given by the following formula:

$$\text{smart release scan} = \big((\text{hardest tick} - \text{slider release tick})/\text{slider release tick}\big) * \text{scans per sec} * \big(\text{zone length inches}/\text{lane speed } ips\big)$$

In such example, the zone length may be the length of the local zone in some measurement, such as inches.

In still other embodiments, the release logic configures the zone operating state of the local zone to OFF if the local zone is determined to be post-photoeye release, the status of the sensor associated with the local zone is occupied or blocked, the zone operating state of the first downstream zone is ON, and the amount of time corresponding to the air gaps in the zone, which is sometimes referred to as the air_in_zone time is less than the release rate time associated with the local zone, which is referred to in some embodiments as smart_release time. A table setting forth this logic is demonstrated in Table 6.

TABLE 6

| Local Zone Operating State | Local Zone Determined Post-Photoeye Release | Local Zone Presence Detected | Downstream Zone Operating State | Air Gap Time < Local Zone Release Rate Timer |
|---|---|---|---|---|
| OFF | TRUE | TRUE | ON | TRUE |
| ON | TRUE | FALSE | ON | TRUE |
| ON | TRUE | TRUE | OFF | TRUE |
| ON | TRUE | TRUE | ON | FALSE |
| ON | TRUE | FALSE | OFF | TRUE |
| ON | TRUE | FALSE | OFF | FALSE |
| ON | TRUE | TRUE | OFF | FALSE |

In still further embodiments, the release logic is configured to determine an amount of air between two zones. That is, in some embodiments, the release logic may determine the amount of air between a local zone and a first downstream zone so as to allow an early activation (e.g., turning ON) of the local zone in certain instances where a lot of air or space is detected downstream of the local zone. For example, in some embodiments, the release logic determines an amount of air between two zones by analyzing a part of a product that is upstream of an active zone's sensor that passes by that active zone's sensor when it starts moving and associates such determination with an amount of air in the entire active zone. By way of non-limiting example, determining the air in zone scans value is given by the following formula:

$$\text{air\_in\_zone\_scans} = \text{timer\_since\_downstream\_activated\_scans} + \text{while\_active\_eye\_clear\_scans} * (1 + \text{predicted\_air\_downstream\_of\_eye\_ratio})$$

where:

while_active_eye_clear_scans is the amount of time measured in scans that a zone's sensor detects air such that the sensor is unblocked for up to the amount of scans that are present for product to normally pass by it with only the selected zone activated predicted_air_downstream_of_eye_ratio is a ratio of the distance downstream of a selected zone's sensor (e.g., photoeye) to the length of the zone upstream of the same selected zone By way of non-limiting example, with respect to while_active_eye_clear_scans, if 24 inches of potential product length is upstream of a selected zone's sensor and still within that zone, the sensor associated with that selected zone counts the number of scans for which the sensor (e.g., the photoeye), is clear for only the amount of time associated with 24 inches of such potential product to flow through. By way of further non-limiting example, if a selected zone is 36 inches in length and a sensor, such as a photoeye, is placed 24 inches from the infeed of such selected zone, the predicted_air_downstream_of_eye_ratio is determined to be 0.5. By way of further non-limiting example, if a selected zone is 72 inches in length and a sensor, such as a photoeye, is placed 24 inches from the infeed of such selected zone, the predicted_air_downstream_of_eye_ratio is determined to be 2.0.

In still further embodiments, the release logic configures the operating state of the local zone to OFF if detectable_gap_exists and the local zone is above or upstream of a slug/release zone and the downstream sensor has not seen a gap for some value (e.g., zero seconds, 1.5 seconds, 2.5 seconds, 5 seconds) greater than or equal to one zone length of time, then the local zone drops to 1-Zone accumulation such that the local zone stops until the downstream zone's sensor becomes clear. This acts as a prejam detector, stops product from overfeeding a slower downstream conveyor/belt, and stops product from connecting to a slug.

In still further embodiments, the release logic is configured such that it determines that detectable gap exists (e.g., adetectable_gap_exists variable) by comparing an offset measurement associated with a sensor's, such as a photoeye's, reflector and the smart release scan value. For example, in a non-limiting example, if the smart release scan is less than the offset measurement associated with a selected sensor (e.g., after converting to equivalent units), the associated gap in between product being released is so small, there is little chance of a sensor detecting or identifying a gap. In such an example, the release logic determines the detectable_gap_exists variable is set to false. In all other instances, the detectable_gap_exists variable is set to true. In a non-limiting example, when the release rate is set to certain high values, such as in instances of slugging wherein the release rate may be as high as 100% release rate, a detectable gap is not expected as all zones set to that release rate value will energize, activate, otherwise turn ON at the same time, thereby introducing no gap. Without any gap, certain pre-jam detection at the requested rate would be detrimental. Accordingly, in such embodiments, the logic associated with such pre-jam detection is disabled by this embodiment.

In still further embodiments, the release logic is configured such that it detects prejams and stops product from overfeeding a slower downstream conveyor/belt. For example, in some embodiments, the operating state of the local zone to set to OFF in an instance where a gap between slugs is expected but a sensor associated with a zone upstream of the discharge zone of an accumulation conveyor 2 (e.g., a local zone) fails to detect a gap between product within a certain amount of time. For example, if a gap detection timer fails to satisfy a predetermined threshold. In some embodiments, if the value of a gap detection timer associated with detecting a gap is greater than a predetermined amount of time associated with a worst case of gap expected between slugs, the zone operating state of such local zone is set to OFF.

Embodiments of the present invention may also be used to prevent back up due to a large grouping of product back to back, which is sometimes referred to as a slug of product. In traditional models, the slug is broken up shortly after it enters the accumulation conveyor from its infeed, resulting in a backup from the infeed continuing to feed into the conveyor. In some embodiments of the present disclosure, the accumulation conveyor 2 is configured to accept the slug from the infeed and the controller 16 is configured to break up the slug further downstream such that the infeed rate is not affected. In such embodiments, the controller 16 is configured to expect a slug and restricts a prejam logic or timer from activating. Instead, the controller 16 is configured to create one or more gaps in the slug further downstream such that the slug is "chopped up." In one embodiment, the controller 16 is configured such that one or more zones within the accumulation conveyor 2 apply prejam-detection algorithms to locate one or more sensors, e.g., photoeyes, that are blocked for a period of time corresponding to the longest mini-slug that is expected equating to a determined maximum period of time. In instances wherein the controller 16 receives input indicating that a mini-slug longer than expected is detected such that one or more sensors are blocked for a period of time greater than the determined maximum period of time, the controller may be configured to revert the affected local zone to another accumulation logic, such as singulation. In such embodiments, the local zone and the downstream zone may place a gap between such zones, chopping the slug into mini-slug bites.

In another embodiment, the controller 16 is configured to re-index a plurality of zones such that one or more zones in a neighborhood are indexed the same to equate to the autoslug size, allowing the product to progress downstream together. For example, a slug may consist of 100 linear feet of product and the controller 16 may be configured to release 20 linear feet of such product downstream. By re-indexing a plurality of zones, the slug can be backfilled at a faster rate. Instead of just one zone releasing and backfilling at a time, the controller 16 is configured to release multiple zones and backfill multiple zones at a time.

In another embodiment, the controller 16 is configured to apply multiple methods and zone configurations within a conveyor at the same time. In existing accumulation conveyors, the same method or accumulation logic is applied to the entirety of the accumulation conveyor. In some embodiments, it is contemplated that the accumulation logic applied in the middle of an accumulation conveyor is different than the accumulation logic applied at the infeed zone of the accumulation conveyor. For example, the accumulation conveyor may require multi-zone configurations in the middle of the conveyor to breakdown a slug, as disclosed herein, while the zones upstream of such slug are operating with the improved, smarter 1-Zone configuration, as described herein, such that the infeed is not slowed down or backed up as a result of the slug breakdown occurring downstream.

In still further embodiments, it is contemplated that two or more accumulation conveyors may be configured such that controller 16 applies or extends the accumulation logic 20 and release logic across the multiple accumulation conveyors to increase throughput. In such embodiments, the furthest downstream zone in a first conveyor (known as the terminating zone or discharge zone) looks at the most upstream zone of the second conveyor, resulting in a back-to-back conveyor system.

In still further embodiments, it is contemplated that even with re-indexing to adjust accumulation aggressiveness, some heavier product lines may require additional zone lengths to slow down to avoid harsh impacts upon stopping product. In such embodiments, the controller 16 configures zones upstream of the stopping point as coast zones. In some embodiments, the number of coast zones increases in accordance with one of the disclosed sliders being adjusted to values translating to less aggressiveness or lower release rates. In some embodiments, such coast zones are configured as "active" but their speed is configured to zero, allowing the product to coast to the stopping point. As such, the coast zones are ON, allowing products to pass through such zone, but the zone are not being driven.

In still further embodiments, it is contemplated that even after product accumulates on the accumulation conveyer 2, gaps may still exist that need to be minimized or closed in a gentle, controlled manner. Crowding is a method that attempts to minimize gaps by pulsing the operating state of the local zone between ON and OFF each time product has accumulated and stopped, thereby compacting product. In traditional methods, the accumulation conveyor is configured such that it waits for downstream zones to finish crowding before the local zone crowds, resulting in lengthy wait times for upstream zones. Accordingly, in some embodiments, the controller 16 is configured to co-crowd multiple zones such that it configures certain zones to crowd simultaneously by pulsing multiple zones ON and OFF. In one exemplary, non-limiting embodiment, with a co-crowding size of 3, the controller 16 may co-crowd zones 1, 4, and 7 simultaneously by pulsing the operating state of each of zones 1, 4, and 7 ON and OFF, and each zone proceed upstream to the next zone respectively.

If through the crowding process or through user intervention, a local zone's sensor becomes clear, traditional accumulation logic generally activates zones upstream to close the gap created, however, such logic would not crowd the local zone more than once as the local zone itself would not have been activated. In still further embodiments, the controller 16 is configured to re-crowd one or more zones such that it configures certain already crowded zones to crowd again by pulsing the crowded zones ON and OFF upon the local zone's sensor change (e.g., from blocked to clear, or clear to blocked). In such embodiments, the re-crowding only re-crowds the local zone and a certain number of zones located upstream from the detection of the gap.

In certain embodiments, the controller 16 is configured such that it will not crowd (or otherwise pulsate ON and OFF the local zone until a first upstream zone of the local zone is also accumulated, ensuring that the local zone is full. In some embodiments, the controller 16 is configured to control the terminating or discharge zone at the most downstream zone of the accumulation conveyor slightly different. In some embodiments, the controller 16 is configured such that when the local zone is the first or second zone at the discharge end of the conveyor (e.g., Zones 1 and 2), the controller waits for two zones upstream to be accumulated before activating the crowding function of the local zone, ensuring that the local zone is at rest and ready to be compacted.

In certain embodiments, a crowding tunable accumulation conveyor is disclosed. The crowding is tuned using an interface similar to the interfaces disclosed herein with respect to release rate and aggressiveness that instead modifies or adjusts one or more crowding parameters in accordance with a crowding logic utilizing input associated with the interface. For example, in one embodiment, the one or more crowding parameters comprise variables such as pulse ON time, pulse OFF time, and delay before pulse. In a non-limiting example, a crowding aggressiveness interface with a slider mechanism comprises a slider range, the slider range comprising one or more sections and each section is associated with a crowding parameter. As the slider mechanism is adjusted, the crowding logic is configured to modify or adjust the crowding parameter associated with the corresponding section of the slider range. In some embodiments, each of the one more sections of the slider range modifies or adjusts the corresponding crowding parameter at a different rate. In a further non-limiting example, as the slider mechanism of such a crowding aggressiveness slider is increased, the aggressiveness of the crowding pulses increases.

In some embodiments, the configuration interface, the accumulation aggressiveness interface, the release rate interface, the crowding aggressiveness interface, and/or other associated interfaces need not be displayed or provided to a user. That is, in some embodiments, it is contemplated that a processor, such as controller 16, associated with an accumulation conveyor 2, is configured to determine the values of such requested variables or data inputs without requiring input from a user or need to display an interface. For example, in some embodiments, the controller 16 may be configured to perform a form of self-diagnostic test to determine the data input associated with the accumulation conveyor 2 and associated product and/or values for appropriate product handling configurations as disclosed herein. For example, based on a knowledge of one or more products being scanned on the accumulation conveyor or receipt of product data from an inventory management system, the system may adjust the appropriate parameters and values for appropriate product handling configurations without the requirement for further user input. In some embodiments, certain guidelines may be associated with different types of products, allowing adjustment of the parameters and values to predetermined configurations based upon at least the product and conveyor data input.

In still further embodiments, the controller 16, the accumulation conveyor 2, and/or the system may be configured to determine the data input and/or the appropriate product handling configuration for a conveyor using one or more machine learning techniques or other similar techniques. For example, product attributes such as weight, slickness, and length vary with each package and can further by affected by the season of the year or shift of the day—all of which affect how product behaves on a configured accumulation conveyor. Additionally, rate calculations, sensors, and algorithms capable of detecting aggressiveness levels and/or release rates directly or indirectly, such as sound, images, rolling averages, and thresholds provide valuable input for machine learning techniques or other similar techniques. Accordingly, in some embodiments, a product handling configuration may be determined based upon a machine learning model utilizing such values, variables, parameters and data inputs calculated, received, and/or sent within the accumulation conveyor system to identify and/or determine relationships among the various data inputs. Such machine learning techniques may implement unsupervised learning techniques, supervised learning techniques, reinforcement learning techniques, deep learning techniques, and/or the like for determining and utilizing relationships for such product handling configuration. Accordingly, such data input and configuration changes may occur without need for displaying or utilizing a user interface and without user intervention.

Figure 2:
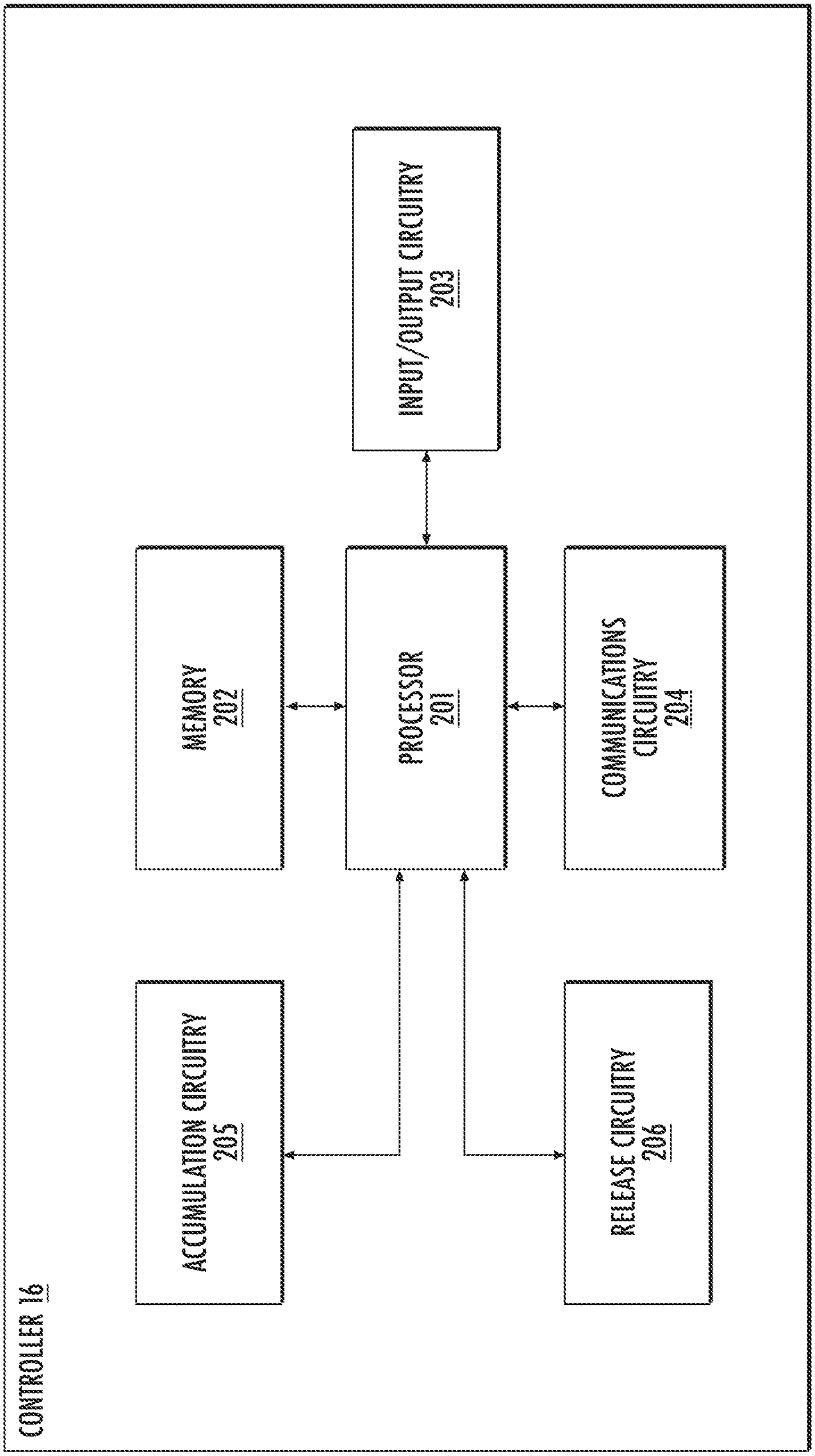
FIG. 2 illustrates a schematic view of a controller in accordance with various aspects and embodiments of the subject disclosure.

The controller 16 of FIG. 1 may be embodied by one or more computing systems, such as the controller 16 shown in FIG. 2. As illustrated in FIG. 2, in accordance with some example embodiments, the controller 16 may include a processor 201, a memory 202, input/output circuitry 203, communications circuitry 204, accumulation circuitry 205, and release circuitry 206. The controller 16 may be configured, using one or more of the circuitry 201, 202, 203, 204, 205, and 206, to execute the operations described herein.

Although these components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus therefore includes particular hardware configured to perform the functions associated with the particular circuitry described herein.

Of course, while the term "circuitry" should be understood broadly to include hardware, in some embodiments, circuitry may also include software for configuring the hardware. For example, in some embodiments, "circuitry" may include processing circuitry, storage media, network interfaces, input/output devices, and the like. In some embodiments, other elements of the controller 16 may provide or supplement the functionality of particular circuitry. For example, the processor 201 may provide processing functionality, the memory 202 may provide storage functionality, the communications circuitry 204 may provide network interface functionality, and the like.

In some embodiments, the processor 201 (and/or co-processor or any other processing circuitry assisting or otherwise associated with the processor) may be in communication with the memory 202 via a bus for passing information among components of the controller 16. The memory 202 may be non-transitory and may include, for example, one or more volatile and/or non-volatile memories. For example, the memory may be an electronic storage device (e.g., a computer readable storage medium). The memory 202 may be configured to store information, data, content, applications, instructions, or the like, for enabling the controller 16 to carry out various functions in accordance with example embodiments of the present invention.

The processor 201 may be embodied in a number of different ways and may, for example, include one or more processing devices configured to perform independently. Additionally, or alternatively, the processor 201 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 201 comprises a plurality of processors. The plurality of processors may be embodied on a single server or may be distributed across a plurality of such devices collectively configured to function as controller 16. The plurality of processors may be in operative communication with each other and may be collectively configured to perform one or more functionalities of controller 16 as described herein.

In an example embodiment, the processor 201 may be configured to execute instructions stored in the memory 202 or otherwise accessible to the processor 201. Alternatively, or additionally, the processor 201 may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor 201 is embodied as an executor of software instructions, the instructions may specifically configure the processor 201 to perform the algorithms and/or operations described herein when the instructions are executed.

In some embodiments, the controller 16 may include input/output circuitry 203 that may, in turn, be in communication with processor 201 to provide output to the user and, in some embodiments, to receive an indication of user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor 201 and/or user interface circuitry comprising the processor may be configured to control one or more functions of one or more user interface elements through computer program instructions (e.g., software and/or firmware) stored on a memory accessible to the processor 201 (e.g., memory 202, and/or the like).

The communications circuitry 204 may be any means such as a device or circuitry embodied in either hardware or a combination of hardware and software that is configured to receive and/or transmit data from/to a network and/or any other device, circuitry, or module in communication with the controller 16. In this regard, the communications circuitry 204 may include, for example, a network interface for enabling communications with a wired or wireless communication network. For example, the communications circuitry 204 may include one or more network interface cards, antennae, buses, switches, routers, modems, and supporting hardware and/or software, or any other device suitable for enabling communications via a network. In some embodiments, it is contemplated that the communications circuitry 204 is configured to use over the air (OTA) and/or firmware over the air (FOTA) capabilities. Additionally, or alternatively, the communication interface may include the circuitry for interacting with the antenna(s) to cause transmission of signals via the antenna(s) or to handle receipt of signals received via the antenna(s).

In some embodiments, the accumulation circuitry 205 includes hardware and software configured to support accumulation-related functionality, logic, features, and/or services of the controller 16. The accumulation circuitry 205 may utilize processing circuitry, such as the processor 201, to perform these actions. The accumulation circuitry 205 may send and/or receive data from an accumulation settings repository (not shown). In some implementations, the sent and/or received data may include accumulation parameters and data, such as acceleration values, deceleration values, zone length, neighborhood size, accumulation models, prior accumulation installation models and/or the like. In some embodiments, such data is utilized to allow for adjustment of aggressiveness in a linear fashion by the user while determining the various parameters and values to be adjusted in the plurality of operational mode settings. It should also be appreciated that, in some embodiments, the accumulation circuitry 205 may include a separate processor, specially configured field programmable gate array (FPGA), or application specific interface circuit (ASIC).

In some embodiments, the release circuitry 206 includes hardware and software configured to support release-related functionality, logic, features, and/or services of the controller 16. The release circuity 206 may utilize processing circuitry, such as the processor 201, to perform these actions. The release circuitry 206 may send and/or receive data from one or more repositories, such as the an accumulation settings repository or a release rate settings repository (not shown). In some implementations, the sent and/or received data may include release rate parameters and data, such as release rate values, zone max speed values, zone length(s), and/or the like. In some embodiments, such data is utilized to allow for adjustment of release rates by the user while determining the various parameters and values to be adjusted in the plurality of operational mode settings. It should also be appreciated that, in some embodiments, the release circuitry 206 may include a separate processor, specially configured field programmable gate array (FPGA), or application specific interface circuit (ASIC).

It is also noted that all or some of the information discussed herein can be based on data that is received, generated and/or maintained by one or more components of the controller 16. In some embodiments, one or more external systems (such as a remote cloud computing and/or data storage system) are also leveraged to provide at least some of the functionality discussed herein.

Example Operations

Figure 4A:
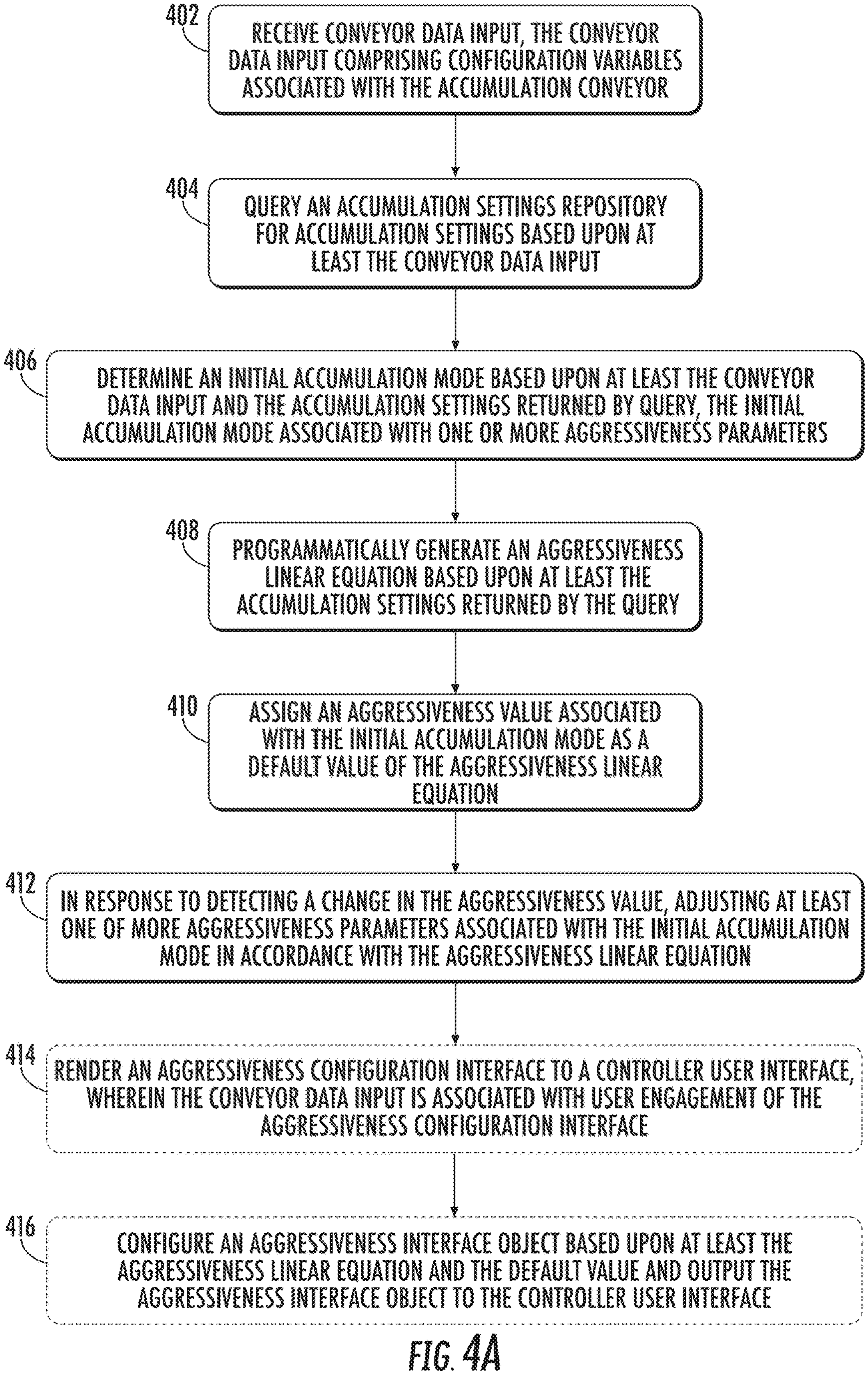
FIG. 4A is a flowchart illustrating example operations for controlling accumulation in accordance with various aspects and embodiments of the subject disclosure.

Having described the circuitry comprising embodiments of the present invention, it should be understood that the controller 16 may control an accumulation conveyor 2 in a number of ways. FIG. 4A broadly illustrates a flowchart containing a series of operations or blocks performed to control an accumulation conveyor 2 in a product handling environment in accordance with example embodiments described herein. The operations illustrated in FIG. 4A may, for example, be performed with the assistance of, and/or under the control of controller 16.

In Block 402, the controller 16 includes means, such as processor 201, input/output circuitry 203, communications circuitry 204, and the like, for receiving conveyor data input, the conveyor data input comprising configuration variables associated with the accumulation conveyor. In a non-limiting example, the conveyor data input is received via user engagement of an aggressiveness configuration interface rendered to a controller user interface. As described above, in some embodiments, the aggressiveness configuration interface embodies an interactive interface configured for displaying queries and receiving conveyor data input via user data input in response to such queries. For example, the queries displayed to the interactive interface include questions posed to the user that are related to configuration variables associated with the accumulation conveyor, such as conveyor speed, average zone length, type of package, average package weight, etc. In other embodiments, the conveyor data input is received via feedback loop or self-test conducted by the accumulation conveyor in order to determine such configuration parameters without requirement of user input or rendering a configuration interface.

In Block 404, the controller 16 further includes means, such as processor 201, accumulation circuitry 205, and the like, for querying an accumulation settings repository for accumulation settings based upon at least the conveyor data input. In some embodiments, the accumulation settings repository comprises aggressiveness parameters and data, such as acceleration values, deceleration values, zone length, neighborhood size, accumulation models, prior accumulation installation models and/or the like.

In Block 406, the controller 16 further includes means, such as processor 201, accumulation circuitry 205, and the like, for determining an initial accumulation mode based upon at least the conveyor data input and the accumulation settings returned by the query, the initial accumulation mode associated with one or more aggressiveness parameters. In some embodiments, the initial accumulation mode is determined based upon pre-determined optimal accumulation settings arranged in an array in the accumulation settings repository. In further embodiments, the initial accumulation mode is determined based upon relationships identified among accumulation objects of the accumulating settings repository wherein the relationships are programmatically determined based upon one or more trained machines learning models.

In Block 408, the controller 16 further includes means, such as processor 201, accumulation circuitry 205, and the like, for programmatically generating an aggressiveness linear equation based upon at least the accumulation settings returned by the query and at Block 410, assigning an aggressiveness value associated with the initial accumulation mode as a default value of the generated aggressiveness linear equation. In Block 412, the controller 16 further includes means, such as processor 201, accumulation circuitry 205, and the like, for in response to detecting a change in the aggressiveness value, adjusting at least one of the one or more aggressiveness parameters associated with the initial accumulation mode in accordance with the aggressiveness linear equation. For example, in some embodiments, adjusting at least one of the one or more aggressiveness parameters associated with the initial accumulation mode in accordance with the aggressiveness linear equation adjusts the level of accumulation aggressiveness associated with the accumulation conveyor in comparison to the default value. For example, in some embodiments, detecting a change in the aggressiveness value corresponds to an indication of decreasing the aggressiveness value. In still further embodiments, detecting a change in the aggressiveness value corresponds to an indication of increasing the aggressiveness value.

In Block 414, in an embodiment where user input is required, it is optionally contemplated that the method may further include rendering an aggressiveness configuration interface to a controller user interface, wherein the conveyor data input is associated with the user engagement of the aggressiveness configuration interface. In Block 416, it is further contemplated that the method may further include configuring an aggressiveness interface object based upon at least the aggressiveness linear equation and the default value and rendering or outputting such aggressiveness interface object to the controller user interface. For example, in an optional embodiment, the aggressiveness interface object is depicted as a slider like in FIG. 5 and is configured for user engagement. As the user adjusts the slider, the level of aggressiveness is adjusted as compared to the default value of the initial accumulation mode. For example, as the user adjusts the slide to increase the aggressiveness value, the controller 16 includes means, such as processor 201, accumulation circuitry 205, and the like for adjusting and stacking one or more operational modes and individual parameters of the accumulation conveyor in such as way so as to reflect the corresponding change in aggressiveness.

Figure 4B:
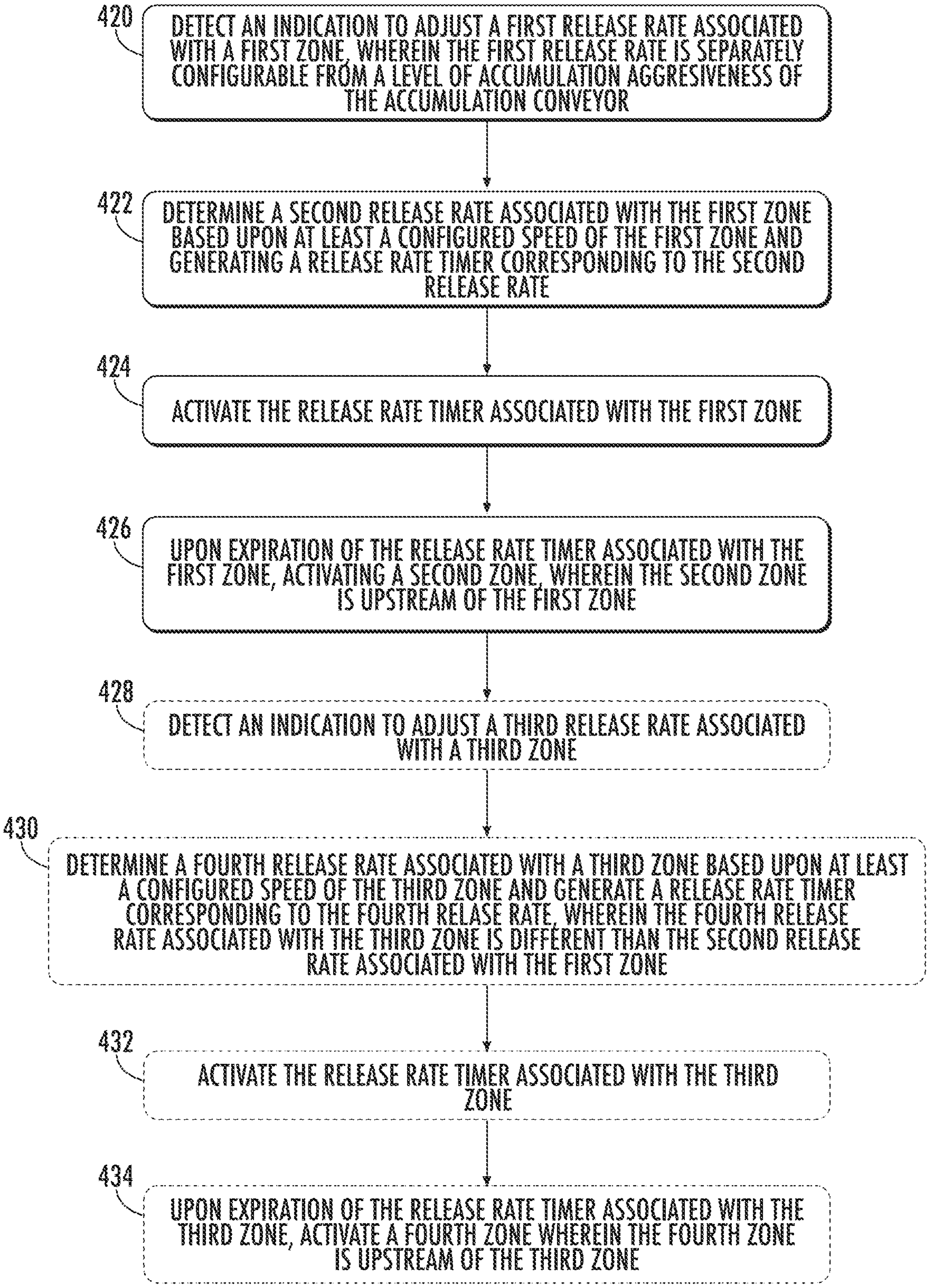
FIG. 4B is a flowchart illustrating example operations for controlling release rate in accordance with various aspects and embodiments of the subject disclosure.

FIG. 4B broadly illustrates a flowchart containing a series of operations or blocks performed to control an accumulation conveyor 2 in a product handling environment in accordance with example embodiments described herein.

The operations illustrated in FIG. 4B may, for example, be performed with the assistance of, and/or under the control of controller 16.

In Block 420, the controller 16 includes means, such as processor 201, input/output circuitry 203, release circuitry 206, and the like, for detecting an indication to adjust a first release rate associated with a first zone, wherein the first release rate is separately configurable from a level of accumulation aggressiveness of the accumulation conveyor. For example, in some embodiments, an adjustment of a first release rate will have not affect the level of accumulation aggressiveness for the first zone or surrounding zones. In some embodiments, detecting an indication to adjust the first release rate associated with the first zone is based upon user input received via a controller user interface.

In Block 422, the controller 16 includes means, such as processor 201, release circuitry 206, and the like, for determining a second release rate associated with the first zone based upon at least a configured speed of the first zone and generating a release rate timer corresponding to the second release rate. For example, in some embodiments, the configured speed of the first zone is determined based upon a percentage of a maximum speed associated with the first zone and the detected indication to adjust the first release rate. In some embodiments, such maximum speed value may be stored in and/or retrieved from a release rate repository.

In Block 424, the controller 16 includes means, such as processor 201, release circuitry 206, and the like, for activating the release rate timer associated with the first zone. In Block 426, upon expiration of the release rate timer associated with the first zone, activating a second zone, wherein the second zone is upstream of the first zone.

In Block 428, it is optionally contemplated that the method may further include detecting an indication to adjust a third release rate associated with a third zone and in Block 430, optionally determining a fourth release rate associated with the third zone based upon at least a configured speed of the third zone and generating a release rate timer corresponding to the fourth release rate, wherein the fourth release rate associated with the third zone is different than the second release rate associated with the first zone. Such an embodiment allows the optional ability to delineate different areas of zones of the accumulation conveyor such that one or more areas have differing release rates is different. For example, a faster release rate may be desired toward the discharge end of the conveyor while a slower release rate resulting in more gap may be desired further upstream to allow for nicer upstream handling.

In Block 430, it is optionally contemplated that the method may further include activating the release rate timer associated with the third zone; and in Block 432, activating a fourth zone upon expiration of the release rate timer associated with the third zone, wherein the fourth zone is upstream of the third zone.

The above descriptions of various embodiments of the subject disclosure and corresponding figures and what is described in the Abstract, are described here for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

Furthermore, as described above and as will be appreciated based on this disclosure, embodiments of the disclosed subject matter may be configured or implemented as systems, methods, apparatuses, computing devices network devices, or articles of manufacture using standard programming and/or engineering techniques to produce software, firmware, hardware, or any combination thereof to control a computer to implement the disclosed subject matter. Accordingly, embodiments may comprise various means including entirely of hardware or any combination of software and hardware.

Embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. The term “article of manufacture” as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or virtual device that emulates a storage device and/or any of the above computer-readable media and the like. As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Thus, particular embodiments of the subject matter have been described. While this specification contains many specific implementation details, these should not be construed as limitations on the scope of any inventions or of what may be claimed, but rather as description of features specific to particular embodiments of particular inventions. In addition, while a particular feature may have been disclosed with respect to only one of several implementations, such feature may be combined with one or more other features of the other implementations as may be desired and advantageous for any given or particular application. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An accumulation conveyor system comprising:

a conveyor having a plurality of zones;

one or more sensors associated with each zone of the plurality of zones;

one or more control modules associated with the plurality of zones; and a controller in communication with the one or more control modules, the controller comprising at least one processor and at least one memory, the at least one memory storing executable instructions therein, wherein the executable instructions are configured to, in execution with the at least one processor, cause the controller to:

determine whether an item detection variable associated with a second zone of the plurality of zones is satisfied, wherein the second zone is downstream of a first zone;

determine whether at least one of two operational characteristic variables is satisfied, the two operational characteristic variables comprising a first operational characteristic variable and a second operational characteristic variable; wherein:

one or more of the first operational characteristic variable and the second operational characteristic variable is satisfied when a pre-jam-countdown-timer associated with the second zone reaches a value less than or equal to zero, and the pre-jam-countdown-timer is activated in an instance where a sensor corresponding to the second zone is unblocked, a sensor corresponding to the first zone is blocked, and a sensor corresponding to a third zone is blocked, and wherein the third zone is upstream of the first zone;

in an instance where both the item detection variable and at least one operational characteristic variable are satisfied, set a zone operating state associated with the first zone to inactive; and send a command signal comprising the zone operating state associated with the first zone to the control module associated with the first zone.

2. The accumulation conveyor system of claim 1, wherein in an instance where the item detection variable is not satisfied, the executable instructions are further configured to cause the controller to set the zone operating state associated with the first zone to active.

3. The accumulation conveyor system of claim 1, wherein the item detection variable associated with the second zone is satisfied when a presence of an object on the conveyor is detected via the one or more sensors associated with the second zone.

4. The accumulation conveyor system of claim 3, wherein at least one of the one or more sensors associated with the second zone is a photo eye and the item detection variable associated with the second zone is satisfied when the controller receives a blocked signal from the photo eye.

5. The accumulation conveyor system of claim 1, wherein in an instance where the first operational characteristic variable and the second operational characteristic variable are not satisfied, the executable instructions are further configured to cause the controller to set the zone operating state associated with the first zone to active.

6. The accumulation conveyor system of claim 1, wherein the first operational characteristic variable is satisfied when a zone operating state associated with the second zone is inactive.

7. The accumulation conveyor system of claim 1, wherein the first zone is associated with a roller countdown timer and the second operational characteristic variable is satisfied when the roller countdown timer is expired.

8. The accumulation conveyor system of claim 7, wherein the roller countdown timer is configured to activate each instance the zone operating state associated with the first zone is inactive.

9. The accumulation conveyor system of claim 7, wherein the roller countdown timer is configured to reset each instance the zone operating state associated with the first zone is active.

10. The accumulation conveyor system of claim 1, wherein the first zone is assigned a local zone number and the second operational characteristic variable is satisfied when the local zone number is less than a threshold associated with assignment of local zone numbers.

11. The accumulation conveyor system of claim 1, wherein the pre-jam-countdown-timer is activated when a potential jam condition is detected in the second zone.

12. A method of conveying articles on an accumulation conveyor having a plurality of zones, the method comprising:

determining whether an item detection variable associated with a second zone of the plurality of zones is satisfied, wherein the second zone is downstream of a first zone;

determining whether at least one of two operational characteristic variables is satisfied, the two operational characteristic variables comprising a first operational characteristic variable and a second operational characteristic variable, wherein:

one or more of the first operational characteristic variable and the second operational characteristic variable is satisfied when a pre-jam-countdown-timer associated with the second zone reaches a value less than or equal to zero, and the pre-jam-countdown-timer is activated in an instance where a sensor corresponding to the second zone is unblocked, a sensor corresponding to the first zone is blocked, and a sensor corresponding to a third zone is blocked, and wherein the third zone is upstream of the first zone;

setting a zone operating state associated with the first zone to inactive in an instance where both the item detection variable and at least one operational characteristic variable are satisfied; and sending a command signal comprising the zone operating state associated with the first zone to a control module associated with the first zone.

13. The method of claim 12, wherein the pre-jam-count-down-timer is activated when a potential jam condition is detected in the second zone.

14. The method of claim 12, wherein in an instance where the item detection variable is not satisfied, the zone operating state associated with the first zone is set to active.

15. The method of claim 12, wherein the item detection variable associated with the second zone is satisfied when a presence of an object on the accumulation conveyor is detected via one or more sensors associated with the second zone.

16. A method of controlling a release rate of a plurality of zones of an accumulation conveyor, the method comprising:

detecting a first indication to adjust a first release rate associated with a first zone;

detecting a second indication to adjust a second release rate associated with a second zone;

adjusting the first release rate based on the first indication;

adjusting the second release rate based on the second indication, and wherein the first release rate is different from the second release rate.

17. The method of claim 16, wherein detecting a first indication and a second indication to adjust the first release rate associated with the first zone is determined by a controller based on execution of a self-diagnostic test;

wherein the self-diagnostic test determines data inputs based on data associated with one or more products being scanned.

18. The method of claim 16, wherein the first indication is detected based upon user input received via a first controller user interface.

19. The method of claim 16, wherein the second indication is detected based upon user input received via a second controller user interface.

20. The method of claim 16, wherein the first release rate and second release rate are configurable from a level of accumulation aggressiveness of the accumulation conveyor.

* * * * *